United States Patent [19]
Kern et al.

[11] Patent Number: 5,410,637
[45] Date of Patent: Apr. 25, 1995

[54] COLOR TOLERANCING SYSTEM EMPLOYING FUZZY LOGIC

[75] Inventors: Kevin B. Kern, Manasquan, N.J.; David L. Alston, Holland, Pa.

[73] Assignee: Color and Appearance Technology, Inc., Princeton, N.J.

[21] Appl. No.: 900,564

[22] Filed: Jun. 18, 1992

[51] Int. Cl.⁶ .................... G01N 21/25; G06F 9/44
[52] U.S. Cl. .................... 395/61; 364/526; 395/900
[58] Field of Search ............ 395/900, 61; 209/580; 364/526

[56] References Cited

U.S. PATENT DOCUMENTS

| | | | |
|---|---|---|---|
| 4,688,178 | 8/1987 | Connelly et al. | 364/470 |
| 4,697,242 | 9/1987 | Holland et al. | 364/513 |
| 4,745,555 | 5/1988 | Connelly et al. | 364/470 |
| 4,881,178 | 11/1989 | Holland et al. | 364/513 |
| 4,918,618 | 4/1990 | Tomlinson, Jr. | 364/513 |
| 4,935,877 | 6/1990 | Koza | 364/513 |
| 5,048,095 | 9/1991 | Bhanu et al. | 382/9 |
| 5,085,325 | 2/1992 | Jones et al. | 209/580 |
| 5,218,555 | 6/1993 | Komai et al. | 364/526 |
| 5,222,155 | 6/1993 | Delanoy et al. | 382/30 |

FOREIGN PATENT DOCUMENTS

| | | | |
|---|---|---|---|
| 3-209137 | 12/1991 | Japan | G01J 3/50 |
| 3-218425 | 12/1991 | Japan | G01J 3/50 |

OTHER PUBLICATIONS

"Docking a Truck: Fuzzy," an article in AI Expert, May 1992.
"CCM System Utilizing a Neural Network," Dyeing and Finishing Technology, vol. 26, No. 8, pp. 553–557, 1991.
"Conversion of a Visual to an Instrumental Color Matching System: An Experimental Approach" by R. Vanderhoven, Textile Chemist and Colorist, May 1992, vol. 24, No. 5, pp. 19–25.
"Neural Networks in the Colour Industry," Applications of Artificial Intelligence in Engineering, vol. V, 1991.

Primary Examiner—Robert W. Downs
Attorney, Agent, or Firm—Richard C. Woodbridge

[57] ABSTRACT

A color measuring system uses fuzzy logic to establish acceptable pass/fail tolerances for production or inventory samples. The tolerances define a super ellipsoid which has six individual tolerance coordinates. Initially, the tolerances are defined by the high/low values of the pass samples in a training set which have been chosen to represent a population of visually rated pass and fail samples. A classifier template uses the super ellipsoid tolerances and ranks every sample in the training set. Any pass/fail ranking that differs from the visual rank is considered an error. All of the error distances are summed and all samples are passed through the fuzzy logic contained in an induction module to determine the changes needed in the super ellipsoid tolerances to minimize the error distance. The new tolerances are then passed to the classifier template for a new ranking of the training samples. The process is repeated until a minimum error distance is achieved. The final tolerances are then used by the classifier to rank subsequent samples as either pass or fail. Shade sorting can also be accomplished. In that case, the training samples are rated twice, first for the centroid color differences and then for the shade differences. The training set is processed by the classifier template/induction module to determine the two tolerances. The classifier then rates production/inventory samples to determine if they meet the centroid color needs, and then places the samples in the proper shade sort group.

7 Claims, 17 Drawing Sheets

FIG. 5A

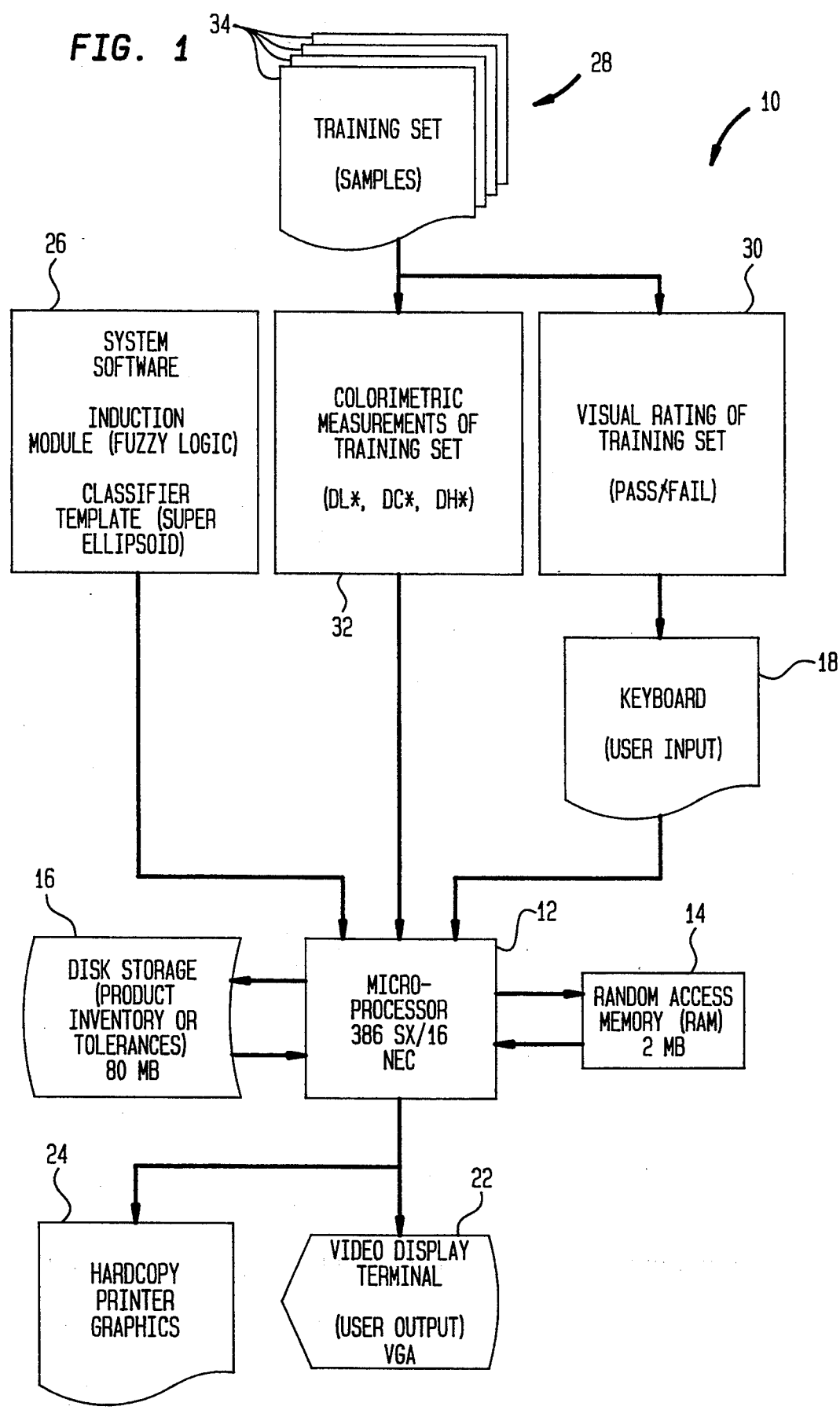

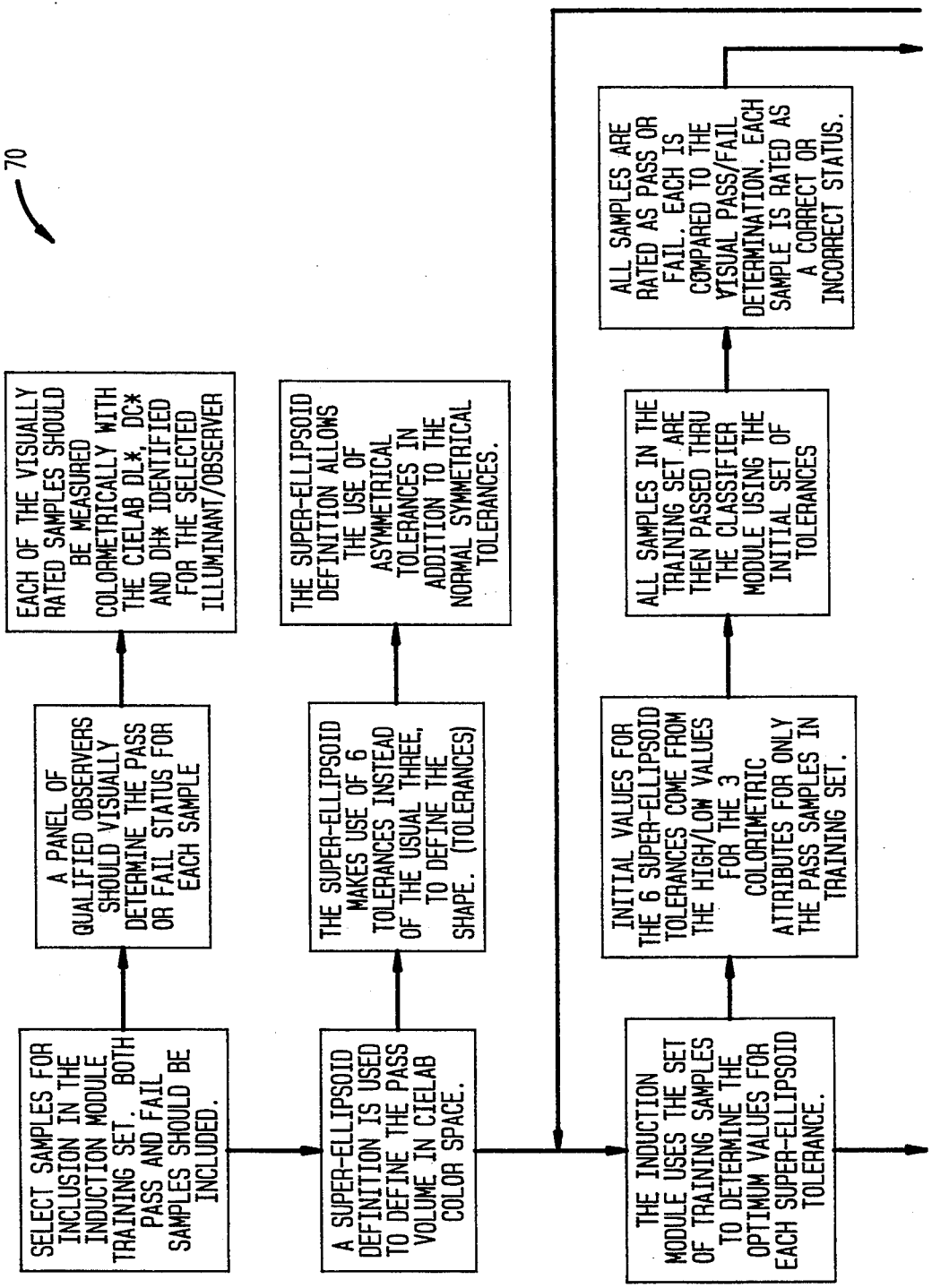

CENTROID COLOR VARIANCE = MAXIMUM ALLOWABLE DIFFERENCE IN COLOR BETWEEN OBJECTS CALLED THE SAME COLOR NAME.
SHADE COLOR VARIANCE = MAXIMUM ALLOWABLE DIFFERENCE IN COLOR BETWEEN PARTS OF ANY ONE OBJECT.

CENTROID COLOR VARIANCE = MAXIMUM ALLOWABLE DIFFERENCE IN COLOR BETWEEN OBJECTS CALLED THE SAME COLOR NAME.
SHADE COLOR VARIANCE = MAXIMUM ALLOWABLE DIFFERENCE IN COLOR BETWEEN PARTS OF ANY ONE OBJECT.

COLOR TOLERANCING SYSTEM EMPLOYING FUZZY LOGIC

BACKGROUND OF THE INVENTION

1. Field of the Invention

The invention relates to a color measuring system and method employing fuzzy logic, classifier templates and super ellipsoids for the purpose of defining acceptability tolerances for color and appearance with subsequent rating of other samples as pass or fail.

2. Description of the Related Art

The problem of defining acceptable tolerances for the color and appearance differences of product taken from a production line is a difficult task. The decision has to be a subjective one since the criteria is visual acceptability and not visual perceptibility. If the tolerances are set too large, the result can be returned product from the field. If the tolerances are set too small, the cost to produce the acceptable product could become prohibitive.

U.S. Pat. No. 4,745,555, a continuation of U.S. Pat. No. 4,688,178, describes the use of color tolerances for the purpose of shade sorting textile fabric. Color tolerances are defined by ellipsoids and are used to classify and place samples according to their color differences from a standard color target in such a way as to minimize the use of samples that lie farthest from the target. Further, the described method only makes use of existing tolerances, and does not appear to provide any capability for defining the acceptability tolerance itself. Only conventional ellipsoid definitions are used to define the color tolerances and, therefore, the definition of color tolerance is limited.

Of possible limited relevance to the invention are the disclosures in U.S. Pat. Nos. 4,697,242; 4,881,178; 4,918,618; 4,935,877 and 5,048,095. These patents cover applications for different types of artificial intelligence such as genetic algorithms and neural networks.

"Docking a Truck: Fuzzy," an article in AI Expert, May 1992, describes a typical use of fuzzy logic. The basic concept of fuzzy sets is that the entire domain of possible observation values is subdivided into a smaller number of subsets. These subsets are usually overlapping, so that a particular observation point may be a partial member of more than one subset. That is, the boundaries to the subsets are fuzzy rather than sharp. Each fuzzy subset is associated with a set of rules that allow for a corresponding action of the proper magnitude and direction. The organization of many subsets into a single result is called defuzzification. In the case of the above article, fuzzy logic is used to transform spatial position into instructions defining the direction and amount to turn a vehicle steering wheel along with information regarding the proper truck velocity to reach the desired spatial position.

The publications, "CCM System Utilizing a Neural Network," Dyeing and Finishing Technology, Vol. 26, No. 8, pp 553-557, and, "Neural Networks in the Colour Industry," Applications of Artificial Intelligence in Engineering, Volume V, 1991, describe the use of fuzzy logic and another artificial intelligence method, namely neural networks, in the area of color. The term CCM stands for Computer Color Matching, which establishes colorant formulations to match specific color targets. Fuzzy logic is used to replace conventional algorithms that determine the colorant formula, while the neural network is used to replace the traditional Kubelka-Munk optical theory of color mixing. While this disclosure describes the practical use of artificial intelligence tools in the area of color, it does not appear to teach or suggest the use of such tools to quantify acceptability tolerances of color and appearance perception for use in classifying subsequent samples for pass and fail. Another publication of possible interest is "Conversion of a Visual to an Instrumental Color Matching System: An Experimental Approach" by R. Vanderhoven, Textile Chemist and Colorist, May 1992, Vol. 24, No. 5, pages 19-25. This represents an attempt to go from a visual to instrumental approach for shade sorting, but the conclusion of the publication was that this approach did not agree well with visual observations.

The need to quantify the visual acceptability tolerances for specific colors so that the tolerances can be used to classify subsequent samples is a desirable operation in the production of colored products. Previous technologies have depended upon the user to provide the tolerances by whatever techniques thought practical. The chosen tolerances might represent rectangular as well as ellipsoidal volumes, even if the visual assessments did not agree. While the user could make a single judgment for a single sample as to its acceptability, he usually found it difficult to express a practical three dimensional tolerance for the total color acceptability of the color. The use of standard ellipsoids as the acceptability volume provides better visual agreement than rectangular volumes. However, it still does not agree well with visual perception on borderline situations especially when the specimens are not flat, uniform or opaque.

SUMMARY OF THE INVENTION

Briefly described, the invention comprises a color measuring system which uses fuzzy logic to establish acceptable pass/fail tolerances for production or inventory samples. The tolerances initially are defined by the high/low values of pass samples in a training set which have been chosen to represent a population of visually rated pass and fail samples. A classifier template makes use of the tolerances to determine the pass/fail status for all of the training samples.

The first step in the process is to train the classifier. The initial tolerance settings of the classifier are based upon a super ellipsoid which has six individual tolerance coordinates. The classifier template uses the super ellipsoid tolerances and ranks every sample in the training set. The determined status for each sample is then compared to the visual status. Any conflicts are considered errors and the total error is then determined for the training set. All of the error distances from a predetermined reference point are summed and all samples passed through the fuzzy logic contained in an induction module to determine the changes needed in the super ellipsoid tolerances to minimize the error distance. The new tolerances are then fed back as new settings to the classifier template for a new ranking of the training samples. The process is repeated until a minimum error distance is achieved, typically defined as (0.0) or after a predetermined number of runs have been made. In this manner, the classifier template is trained and then used as a standard for subsequent samples. Once the classifier is trained, it can be employed to rank production samples. If the results of the ranking fall into an area of uncertainty, then those samples can be included in future training sets for future retraining of the classifier template.

The same basic concept can be employed for shade sorting. Initially, a group of pass/fail samples is chosen for inclusion in a training set so that there are two values for each sample. One value represents the pass/fail values for centroid color and the second value represents the pass/fail values for shade color. The first and second set of values describe a pair of super ellipsoid volumes that establish two sets of tolerances for two classifier templates. Each of the two classifier templates is trained in the manner previously described by summing the error distances of the samples from two reference points. Fuzzy logic contained in the induction module is used to determine which tolerances of the super ellipsoid to change to minimize the error distances. That, in turn, defines two new super ellipsoids based upon the changed tolerances which are used to establish new tolerances for the two classifier templates. The training steps are repeated until the minimum error is equal to zero or a maximum number of iterations has been performed. The shade centers based upon the shade classifier template tolerances are such that they cover the entire centroid super ellipsoid. Once the classifier has been trained, it can be employed to evaluate and measure production runs for centroid color and shade.

These and other features of the invention may be more fully understood by reference to the following drawings.

BRIEF DESCRIPTION OF THE DRAWINGS

FIG. 1 is a schematic illustration of the preferred embodiment of the color tolerancing invention.

DETAILED DESCRIPTION OF THE INVENTION

Figure 2A:
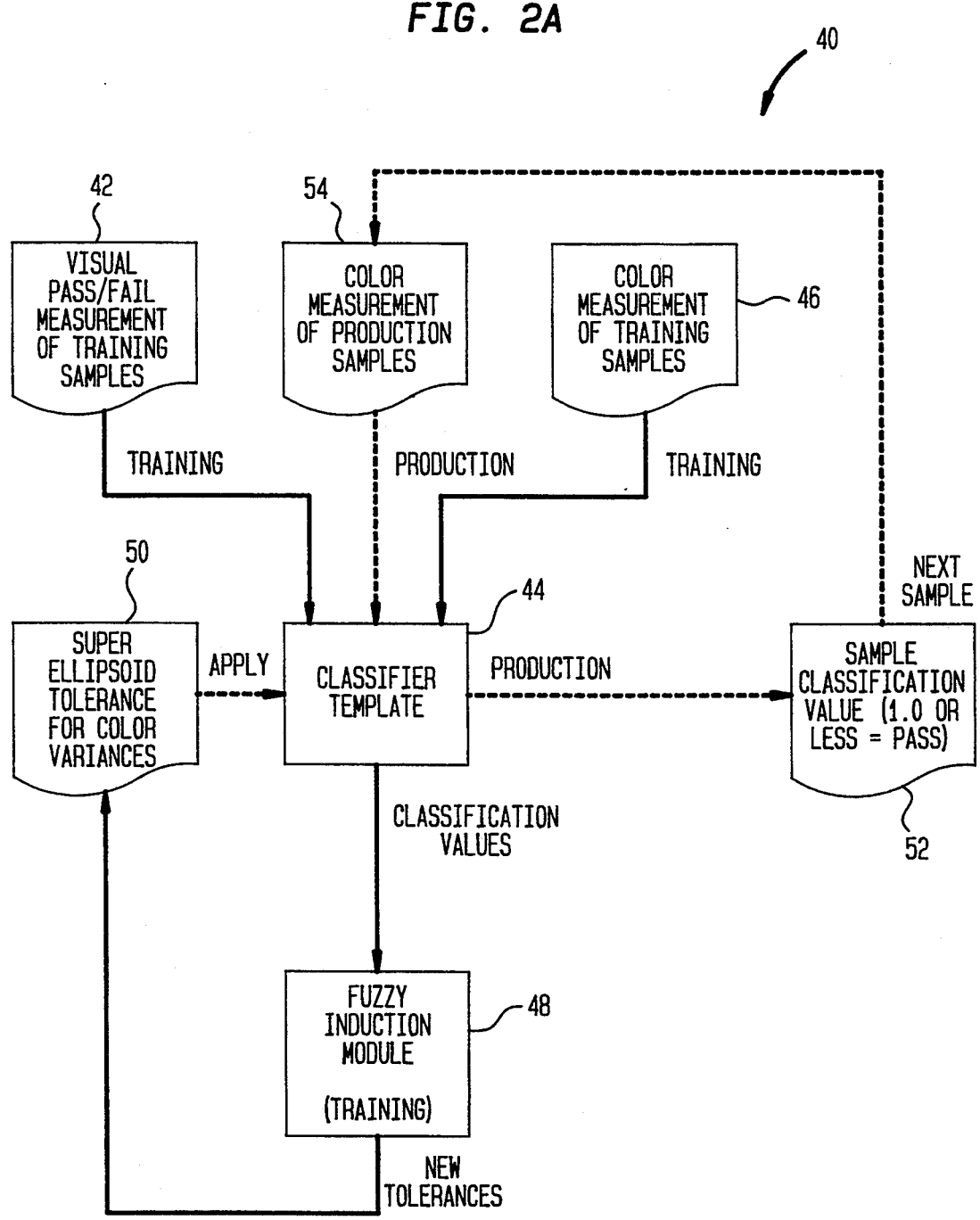
FIG. 2A illustrates the relationship between the computer programs which drive the microprocessor.

During the course of this description, like numbers will be used to identify like elements according to the different figures which illustrate the invention.

The invention 10 according to its preferred embodiment is illustrated in FIGS. 1 through 3B and FIGS. 5A–5C. FIG. 1 describes the basics of the overall system 10 which is driven by microprocessor 12. Microprocessor 12 is serviced by a standard Random Access Memory (RAM) 14 and a storage disk 16 which includes an inventory of products and/or tolerances. The output from the microprocessor 12 is displayed on a video display terminal 22 or can be reproduced on a hard copy printer 24. System software 26 described in further detail in FIG. 2A includes instructions for the fuzzy logic induction module 48 and the classifier template 44 based upon the tolerances of a super ellipsoid 80 illustrated in FIGS. 5A–5C. A training set of samples 28 including insets 34 is initially visually rated to determine a set of pass/fail samples 30. The pass only portion of the training set samples 30 are inputted to keyboard 18 by the user as an initial input to microprocessor 12. Ultimately, colormetric measurements of the training set (DL*, DC*, DH*) 32 provide parameters to the microprocessor 12 for the rating on a pass/fail basis of future production samples.

A more detailed description of the application system software 26 is illustrated as flow chart 40 in FIG. 2A. The pass only portion of the visually rated training set 30 previously inputted by keyboard 18 provides a set of data 42 representative of the visual pass/fail determinations of the training set. That forms one input to the classifier template 44. Subsequent color measurements of the training samples 46 also provide an input to the classifier template 44. The classifier template 44 rates the samples and the output thereof is manipulated by the fuzzy logic induction module 48 to calculate the six new tolerance coordinates of a super ellipsoid 80. Software module 50 calculates the new super ellipsoid tolerances for color variance and using the six new tolerance coordinates modifies, or trains, the classifier template 44 to improve its accuracy. The process is repeated until the sum of the distances from a reference point are substantially zero (0,0) or a predetermined period of time has passed. Then subsequent production samples are evaluated by sample classification module 52 wherein a 1.0 or less is a pass and greater than a 1.0 is a fail and the results thereof provide an input to the color measurement of production samples module 54 which provide a new input to the classifier template 44.

Figure 2B:
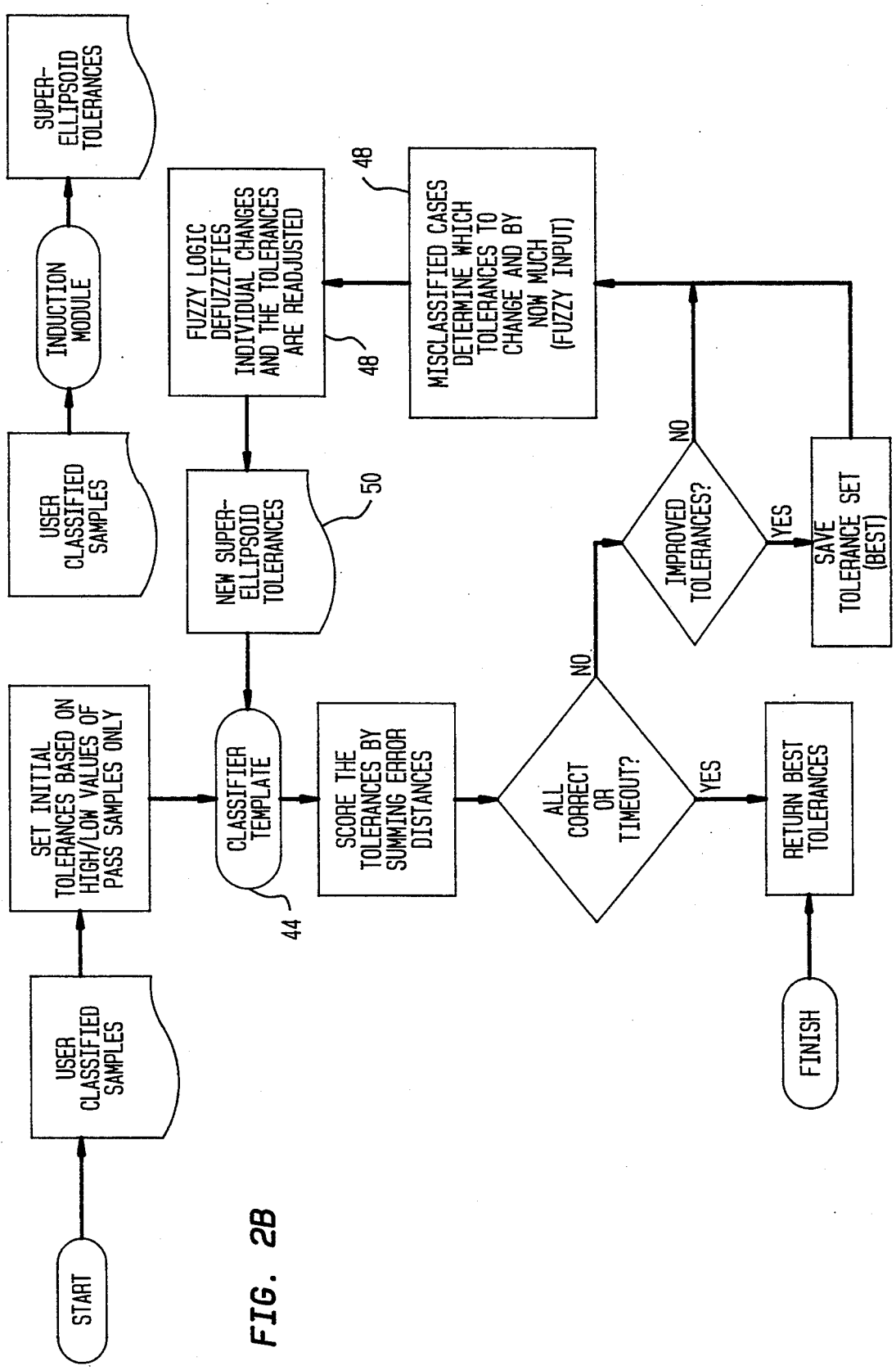
FIG. 2B is a pass/fail flow chart illustrating the manner in which the classifier according to the preferred embodiment is trained.
Figure 2C:
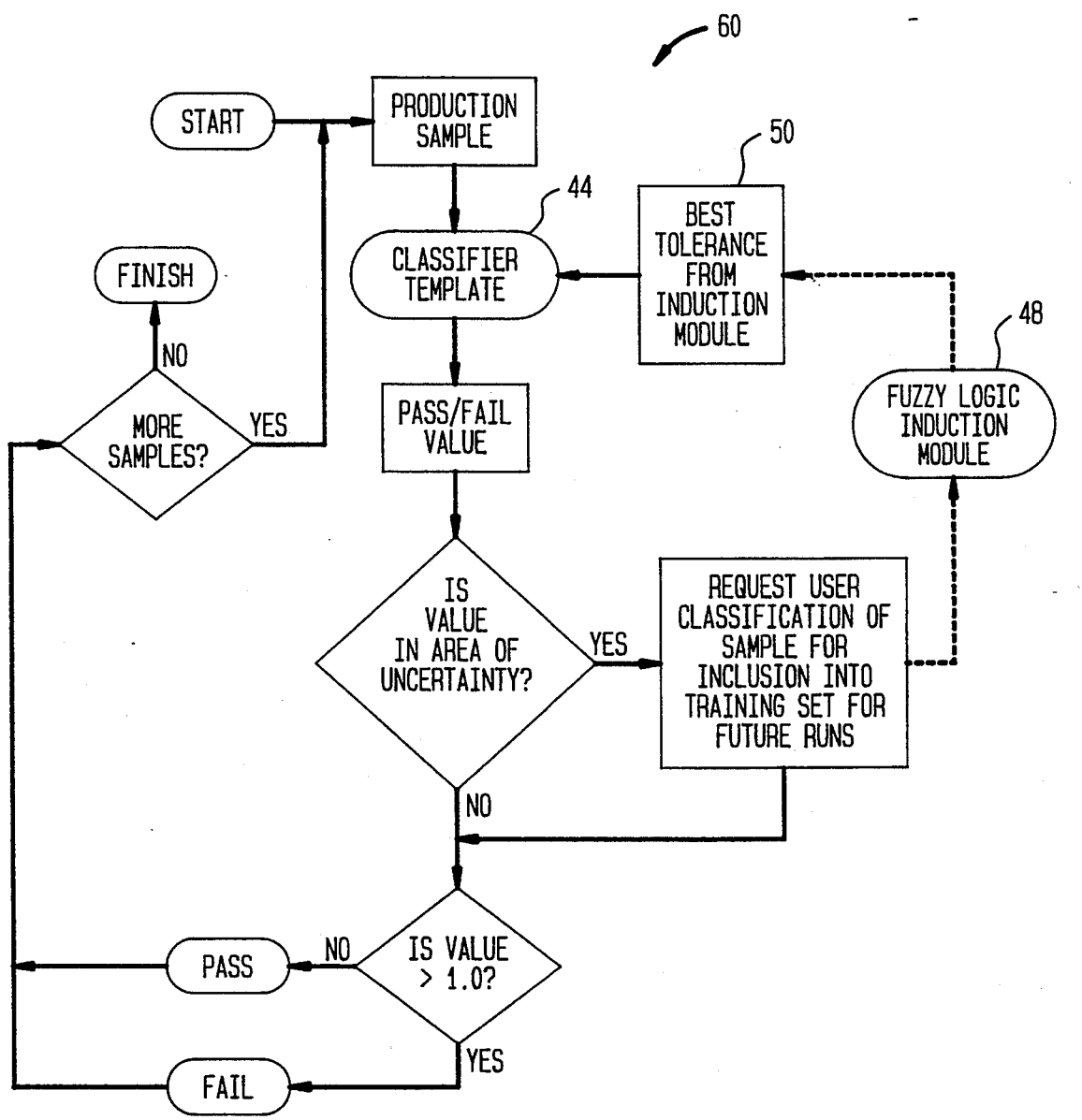
FIG. 2C is a pass/fail flow chart illustrating the manner in which the trained classifier evaluates production samples according to the preferred embodiment of the invention.
Figure 2D:
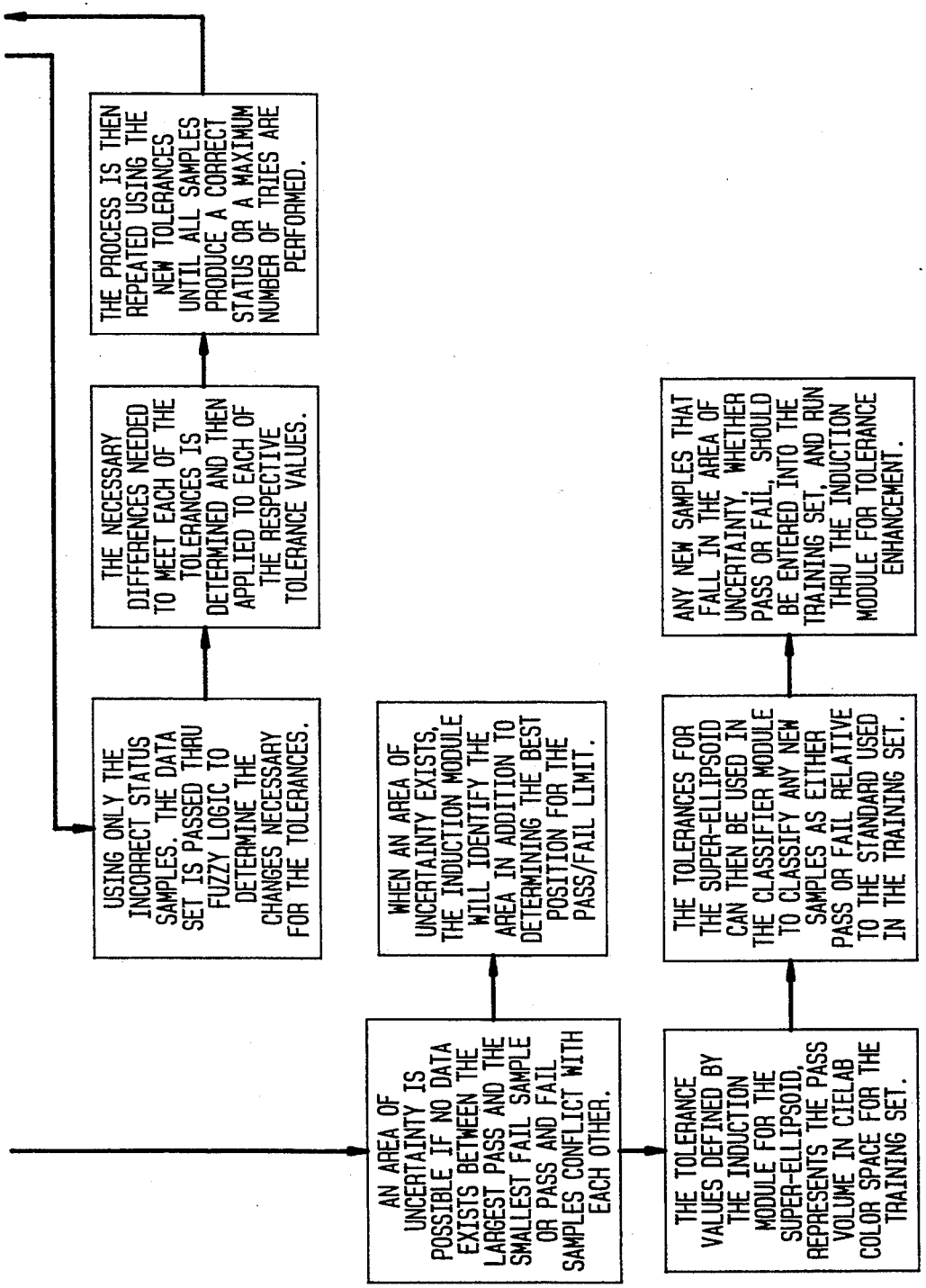
FIG. 2D is a pass/fail flow chart verbally describing the steps of the preferred embodiment of the invention.

The step wise operation of the preferred embodiment 10 of the present invention can be better understood by referencing to the flow charts in FIGS. 2B, 2C and 2D.

There are two basic steps that are necessary for the preferred embodiment 10 of the invention to operate. First, it is necessary to define the color and appearance tolerances of acceptability for the product as described in the flow chart 50 of FIG. 2B. Second, it is then necessary to define the pass/fail status for any subsequent production samples as described in flow chart 60 in FIG. 2C based upon the established tolerances initially set by the flow chart 50 of FIG. 2B.

The flow chart 50 of FIG. 2B describes how the classifier template 44 is trained based upon the tolerance values of the training set 28. The process of defining the color and/or appearance tolerance of a system is referred to in this disclosure as "training the classifier" and is accomplished through an evaluation of the training sample set 28. The training samples 28 provide the basis for obtaining both visual and instrumental data about the color/appearance acceptability of the product. Each training subset 34 within the larger sample set 28 includes a specific sample that is defined as the standard. This standard represents the optimum color/appearance for the product. All other samples in the training set are defined relative to this standard. The visual data, usually rated by a human expert, is in the form of a pass or fail judgment to determine whether the sample is acceptable according to certain color and/or appearance criteria. This instrumental data is set forth as a numerical delta difference from the standard's absolute measurement for all defined attributes of color/appearance.

An initial set of tolerances is determined for the high and low values for each color/appearance attribute measurement for only the pass samples of the training set 28. The classifier template 44 makes use of these tolerances and determines a pass/fail status for all of the training samples 28. The determined status of each sample is compared to the visual status. Any conflicts are considered errors and the total error, i.e. the sum of the errors, is then determined for the training set.

An induction module 48 based upon fuzzy logic determines the change needed in the tolerances to reduce the error to a minimum. The nature of the fuzzy logic used in induction module 48 is of the sort generally described in the following publications: "Neural Networks and Fuzzy Systems," by Bart Kosko, Prentice Hall 1992; "Analysis of Fuzzy Information," by James Bezdek, CRC Press 1987; "Fuzzy Sets and Systems: Theory and Applications," by D. J. DuBois and H. Prade, Academic Press 1980; "Introduction to the Theory of Fuzzy Sets," by A. Kaufmann, Academic Press 1975; "Fuzzy Set Theory—and its Applications," by H. J. Zimmermann, Academic Press 1985.

In order to use fuzzy logic, it is only necessary to understand the basic initial system constraints which are set out in full and enabling detail in this disclosure. Once these constraints are known, fuzzy logic is applicable in the same manner as is described in the foregoing publications.

Figure 4A:
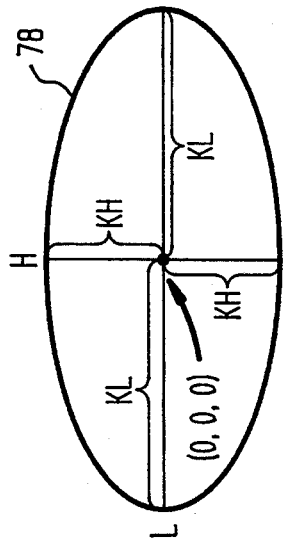
Figure 4B:
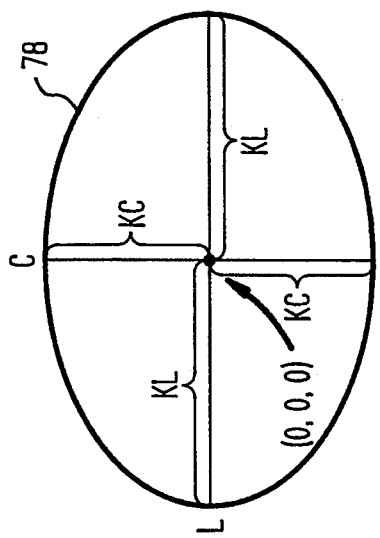
Figure 4C:
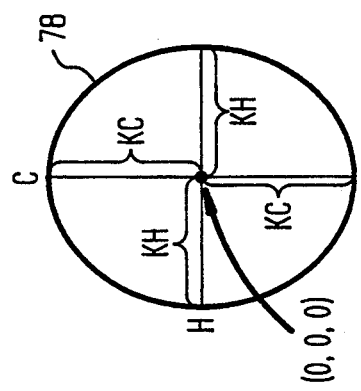
Figure 5B:
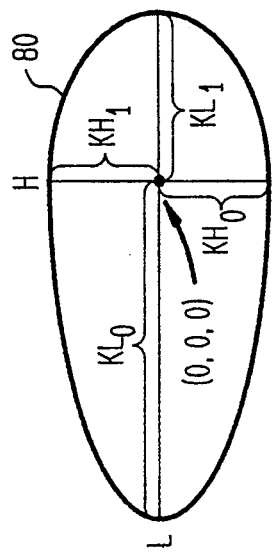
FIGS. 5A, 5B and 5C respectfully illustrate the shape and characteristics of a super ellipsoid as seen from the L, C and H axes.
Figure 5A:
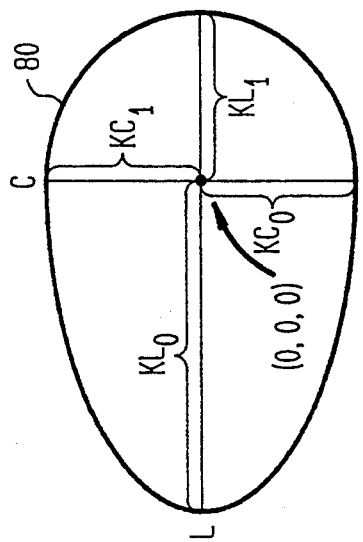
Figure 5C:
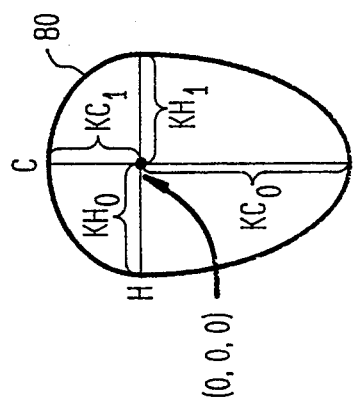

The tolerances determined by the fuzzy logic induction module 48 define the six coordinates of a super ellipsoid 80 described in FIGS. 5A, 5B and 5C. Super ellipsoid 80 is a significant improvement over prior art, conventional ellipsoids 78 such as illustrated in FIGS. 4A, 4B and 4C. A conventional prior art ellipsoid can be defined by the following equation and relationships:

$$\frac{L^2}{KL^2} + \frac{C^2}{KC^2} + \frac{H^2}{KH^2} = 1.0$$

where KL is always one half of L variance and KC is always one half of C variance and KH is always one half of H variance. In contrast, the super ellipsoid geometric volume 80 illustrated in FIGS. 5A-5C is described by the following equation and relationships:

$$\frac{L^2}{KL^2} + \frac{C^2}{KC^2} + \frac{H^2}{KH^2} = 1.0$$

where
L, C, H represent an input sample, and,
$KL_0$ is the negative tolerance for L, and,
$KL_1$ the positive tolerance
$KC_0$ is the negative tolerance for C, and,
$KC_1$ the positive tolerance
$KH_0$ is the negative tolerance for H, and,
$KH_1$ the positive tolerance
where $KL_o$ can be any portion of L variance and $KC_o$ can be any portion of C variance and $KH_o$ can be any portion of H variance and
if $L<0$, $KL=KL_0$ otherwise $KL=KL_1$; and,
if $C \leq 0$, $KC=KC_0$ otherwise $KC=KC_1$; and,
if $H \leq 0$, $KH=KH_0$ otherwise $KH=KH_1$.

It is clear from reviewing the form of the super ellipsoid geometric volume or shape 80 that the form is relatively unsymmetrical in view of the fact that it has six different potential tolerance values around an origin (0,0,0). This has been found, according to the present invention, to be a superior description of the tolerance parameters for a classification template 44 in that it produces significantly better pass/fail determinations. The centroid point (0,0,0) is a reference point which is preferably located within the volume defined by super ellipsoid 80, but, alternatively, the reference point could be any point within or even outside of the super ellipsoid depending upon the standards provided to initially define the classifier template tolerances.

The six new defined coordinates of super ellipsoid 80 are employed to provide six new tolerance settings for the classifier template 44. The process is repeated until a minimum error equal to zero (0.0) or a maximum number of iterations has been performed. The final tolerances are assigned as a production standard and define acceptable ranges of color/appearance tolerances for future production runs. Module 52 determines if a production sample has a value of 1.0 or not. If the classification value is 1.0 or less, then the production sample falls within the super ellipsoid volume 80 and is determined to be a pass. If, alternatively, the sample value is greater than 1.0, then the production sample is determined to be a fail. The samples processed by module 52 are subsequently measured by module 54 and provide new information to classifier template 44.

The foregoing process produces tolerances that reflect the quality judgments made by a visual assessment of the training samples 28. It is, therefore, important to have a representative set of training samples that reflect an expert's assessment of acceptable tolerances. If a training set is not available, such as an initial production run, it is still important to have an assessment of what is acceptable. A few carefully selected samples that an expert determines to be representative of the maximum tolerances for each of the color/appearance attributes can produce tolerances that can be used in the classifier module 44 to control production through the first run. Samples of that run can then be visually rated and measured to produce a representative training set for future tolerances. The process of using a classifier module 44 with a specific set of tolerances produced by the induction module 48 using a training set of samples that represent the product to be evaluated is known as a pass/fail determination.

Flow chart 60 shown in FIG. 2C illustrates the manner in which subsequent production runs are rated on a pass/fail basis. The classifier template 44 calculates a pass/fail value for each of the production samples. If the value is equal to, or less than 1.0, then as previously described, the sample is rated as a pass. If the value is above 1.0, the sample is rated as a fail. Or as stated another way, if the value is equal to or less than 1.0, the sample falls within the volume of the super ellipsoid 80, but if the value is above 1.0, the sample falls outside of the super ellipsoid volume 80. However, if the value falls into an intermediate area of uncertainty, then the system 10 can request classification of the sample for inclusion into a future training set for future runs. In that case the fuzzy logic induction module 48 will establish new tolerances defining six new coordinates for the super ellipsoid 80 defined in module 50 which in turn may retrain the classifier 44 to further improve its accuracy for future pass/fail evaluation of production samples.

The pass/fail flow chart 70 of FIG. 2D illustrates in an alternative, verbal form, the steps illustrated in flow charts 50 and 60, respectively, of FIGS. 2B and 2C.

Figure 3A:
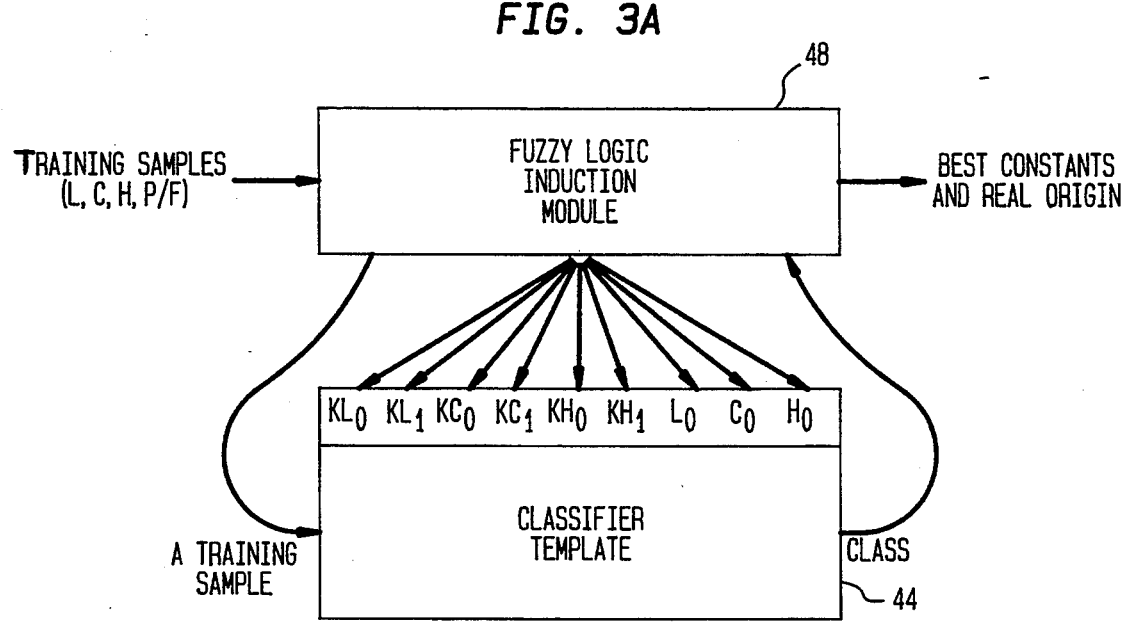
FIGS. 3A and 3B illustrate constraints put upon the classifier module and its relationship to the induction module FIGS. 4A, 4B and 4C respectively illustrate a prior art, conventional ellipsoid as seen from three orthogonal axes L, C and H.

FIG. 3A illustrates in a simplified form, the constraints on the system 10 and the relationship between the classifier template 44 and the fuzzy logic induction module 48. The fuzzy logic induction module dictates nine separate values which define the shape and location of the super ellipsoid 80. Six of the tolerance values L0, L1, C0 C1, H0, H1 define the six coordinates of the super ellipsoid 80 and L0, C0 and H0 define its distance from a reference point which may or may not be the center of the coordinate system. The input from the training samples 28 provide the initial tolerances for the classifier template 44. If the sum of the tolerance errors is not substantially equal to zero (0.0) or if a maximum period or a maximum number of iterations is passed, then the information is passed to the fuzzy logic module 48 which in turn adjusts the six super ellipsoid coordinates L0, L1, C0, C1, H0 and H1 which, in turn, define a new, modified and improved set of tolerance values for the now trained classifier template 44. The fuzzy logic induction module 48 may also provide some new reference point coordinates L0, C0, H0.

Figure 3B:
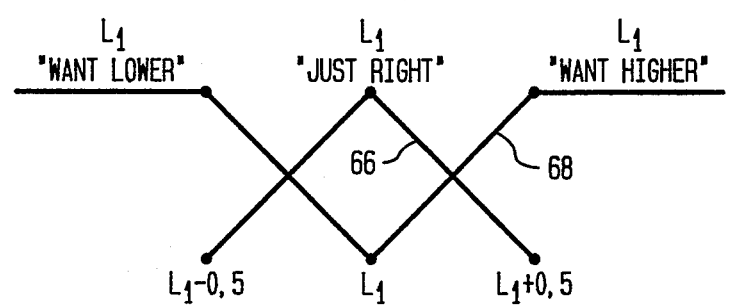

FIG. 3B illustrates in a simplified form the manner in which the fuzzy logic, defined by the module 48, makes a determination if, and by how much, the tolerance coordinates of the super ellipsoid 80 and the tolerance values of the classifier module 44 need to be changed. Curve 66 illustrates the value of the observed L1 and curve 68 illustrates the range which determines whether or not the new value L1 should be increased or decreased. If the value of L1 decreases by as much as 0.5, then the coordinate L1 should be decreased, and, alternatively, if the observed L1 is greater than 1.5 L1, then L1 should be increased.

The preferred embodiment of the invention just described has several advantages over prior art approaches. First, the tolerances used in the pass/fail determination are calculated automatically from a group of single, visual observations of standard and sample for color and appearance pass/fail determination. Since the visual decisions are made by a resident expert, the tolerances will reflect the tolerances of the expert and will be considered as acceptable tolerances. Second, the process can learn by the addition of selected samples to the training set. If these new samples are representative of recent color/appearance tolerances (pass/fail), the tolerances can be improved by running the induction module 48 again with the new samples. Third, the process makes use of a new super ellipsoid 80. This new geometric shape allows for greater accuracy in the definition of the acceptability volume since it has six independent definitions of its major axes. Fourth, the super ellipsoid 80 can handle asymmetrical definitions as well as those comparisons where the standard being used is an off-set standard. The off-set standard by itself is not considered to be acceptable, but is provided only as a reference color. Therefore, the super ellipsoid 80 can be defined with respect to a reference point that might be outside of the volume itself.

Figure 6A:
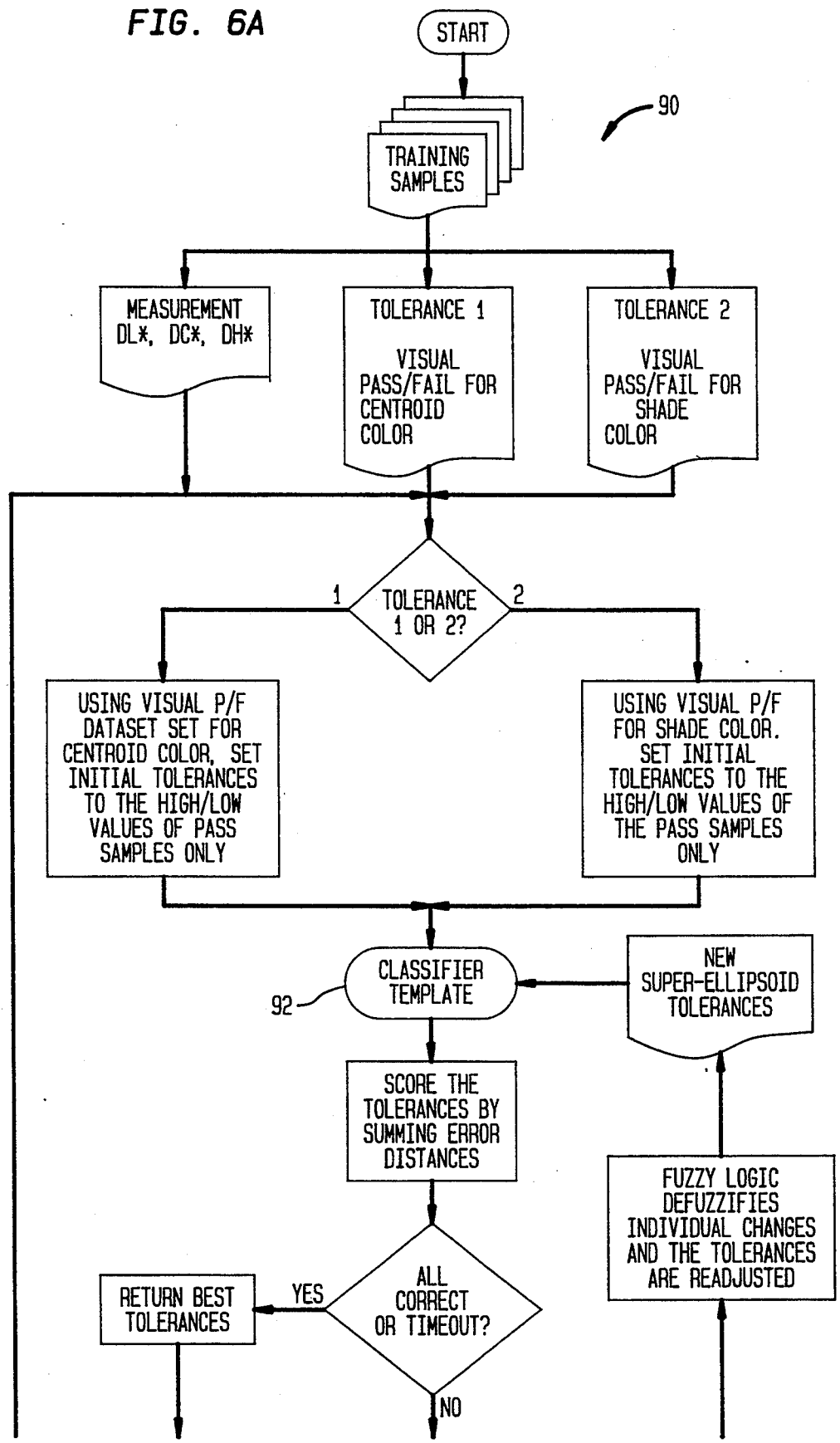
FIG. 6A is a shade sorting flow chart illustrating the manner in which the classifier is trained according to an alternative embodiment of the invention.
Figure 6A:
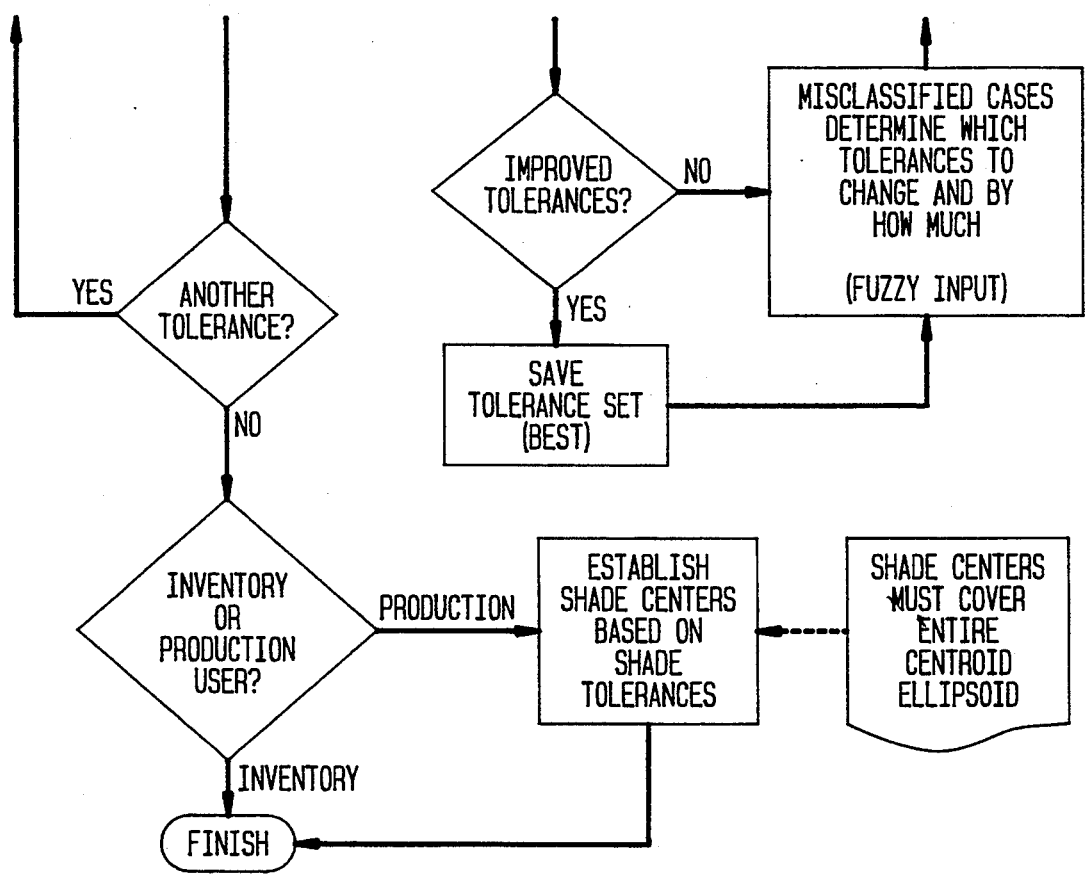
Figure 8:
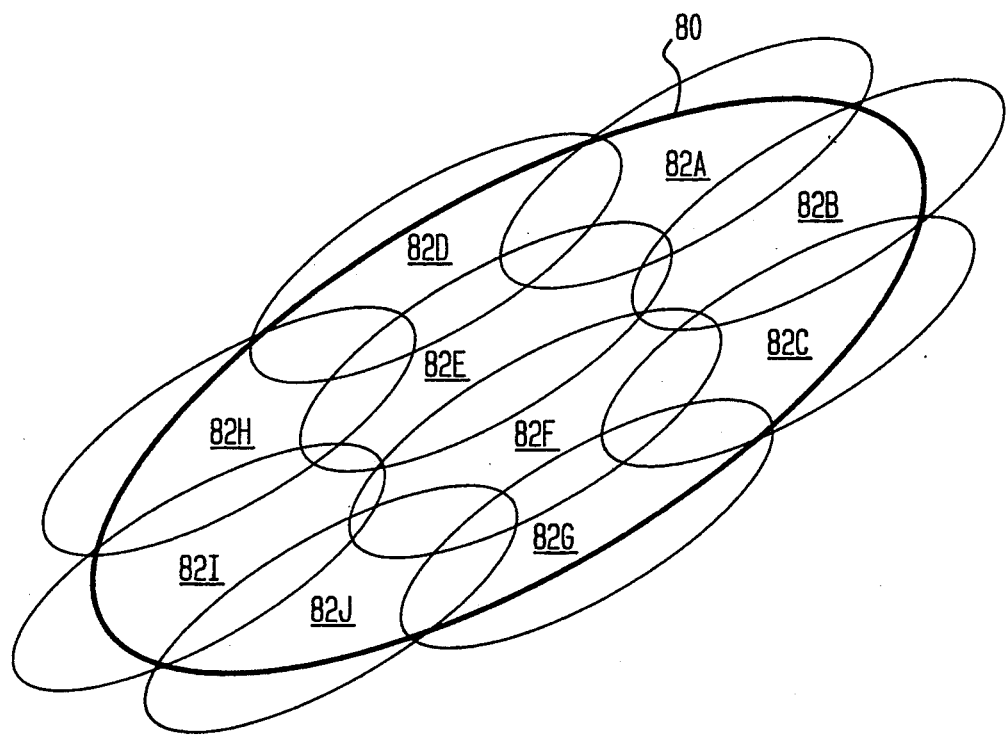
FIG. 8 illustrates the manner in which a plurality of substantially identical shade center super ellipsoids cover a centroid color super ellipsoid for shade sorting purposes.

The concepts just described with reference to the preferred embodiment 10 can also be applied to a more sophisticated system that is capable of first sorting samples according to their centroid color and then making a judgment concerning those samples with regard to shade. The shade sorting flow chart 90 illustrated in FIG. 6A illustrates the manner in which the classifier 92 according to the alternative embodiment of the invention is trained. Initially, a plurality of pass/fail values are selected for inclusion in a training set where there are two values for each sample. The first value represents the pass/fail values for centroid color and the second value represents the pass/fail values for shade color. The pass values of the training set are then separately compared against two classifier templates based upon two sets of super ellipsoids 80 and 82A–J. While only one classifier template 92 is illustrated in FIG. 6A, it is understood that at different times, it will have different values and act as two different templates, one for centroid color and one for shade color, based upon the tolerances set by the two sets of super ellipsoids 80 and 82A–J. The first super ellipsoid 80 is defined by six coordinates for centroid color. The second super ellipsoid is actually a plurality of smaller super ellipsoids 82A–J which are described by six coordinates which define color shade. The errors of the samples passed through the two classifiers are summed with respect to their distances from two reference points. Fuzzy logic contained in an induction module is then employed to determine which tolerances to change to minimize the two error distances. The fuzzy logic then redefines two sets of six new coordinates which redefine two new super ellipsoid geometric volumes which, in turn, define two sets of six tolerance values for the two classifier templates. The result is two sets of classifier template tolerances such that a plurality of smaller shade center super ellipsoids 82A–82J cover the entire surface of the centroid super ellipsoid volume 80 as shown in FIG. 8.

Figure 6B:
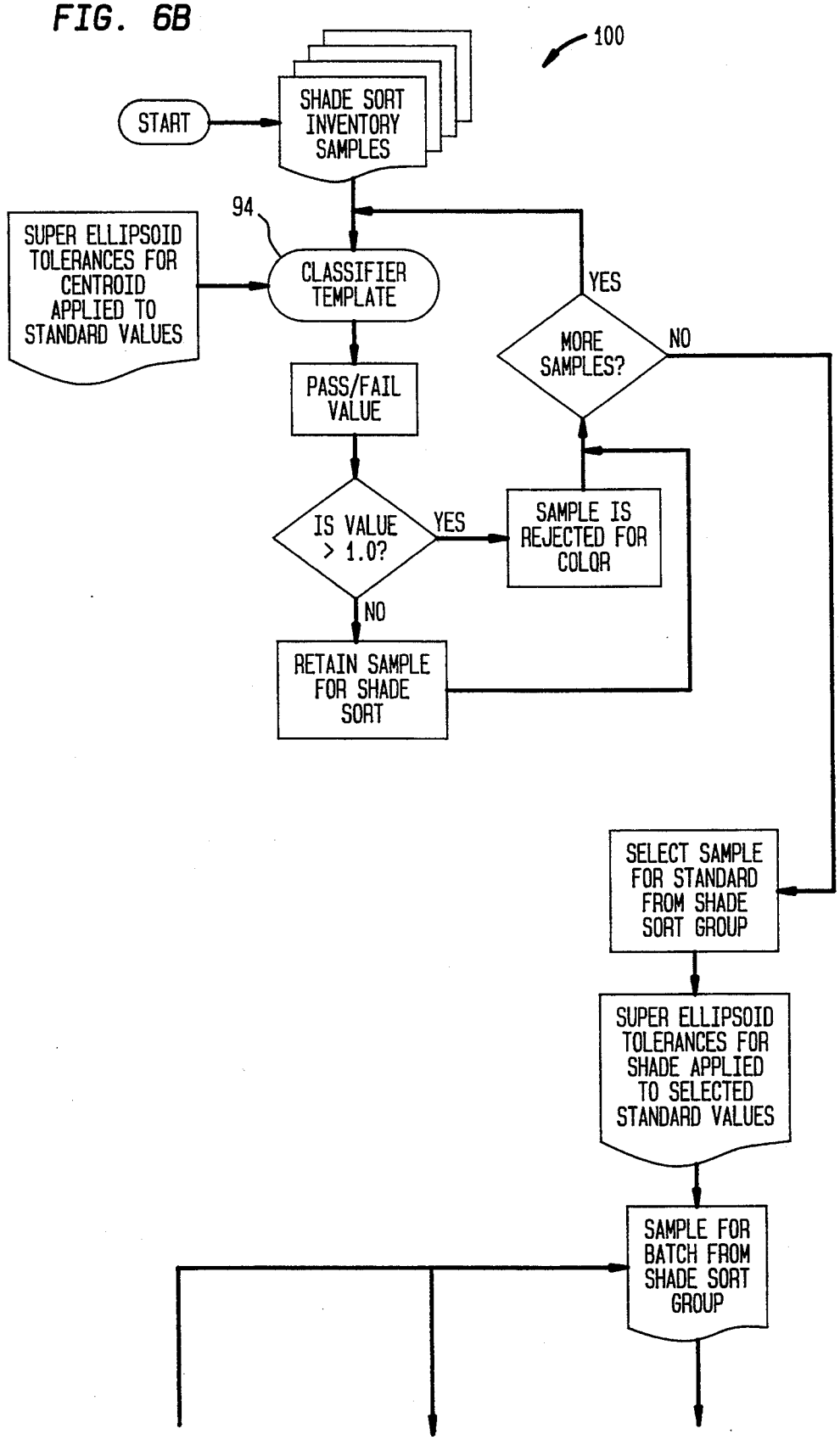
FIG. 6B is a shade sorting flow chart illustrating the manner in which inventory is checked for centroid color and then sorted for maximized shade according to the alternative embodiment of the present invention.
Figure 6B:
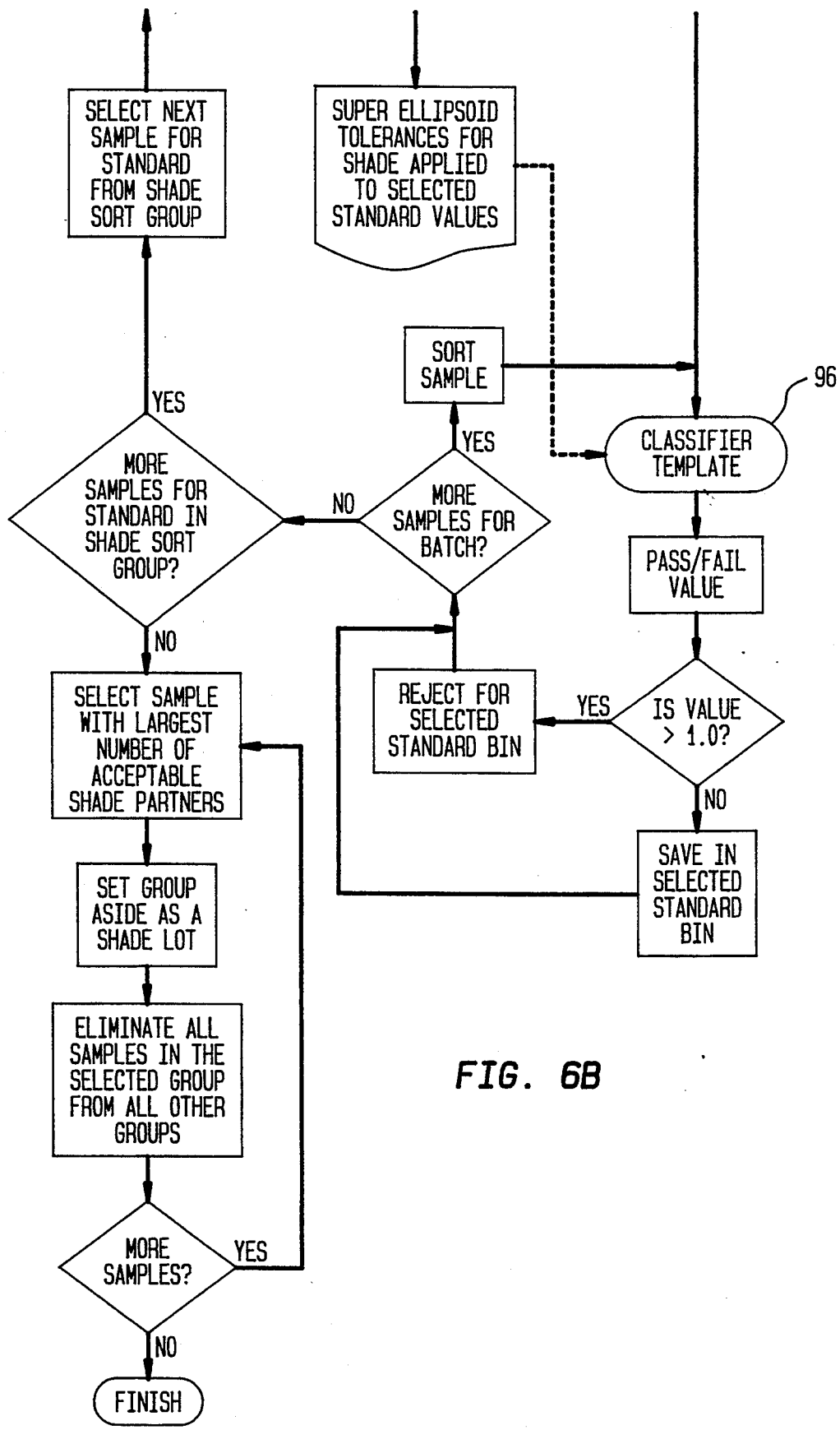

The shade sorting flow chart 100 in FIG. 6B illustrates the manner in which the system can check inventory samples for centroid color and then the pass samples are maximized in a shade sort. As shown in the flow chart, the shade sort inventory samples are first compared in the classifier template 94 employing the coordinates of a super ellipsoid in which the tolerances for centroid color are compared against the standard value. If the samples have a value greater than 1.0, then they fail and are rejected. However, if the samples have a value of less than 1.0 for centroid color, then they pass and are sorted in a manner to maximize shade groupings. The passed samples are compared in a second classifier template 96 using the tolerances of a super ellipsoid which represents shades compared against selected standard values. The output of the flow chart system 100 illustrated in FIG. 6B is lots of material in which the outputs are maximized for shade sorting.

Figure 6C:
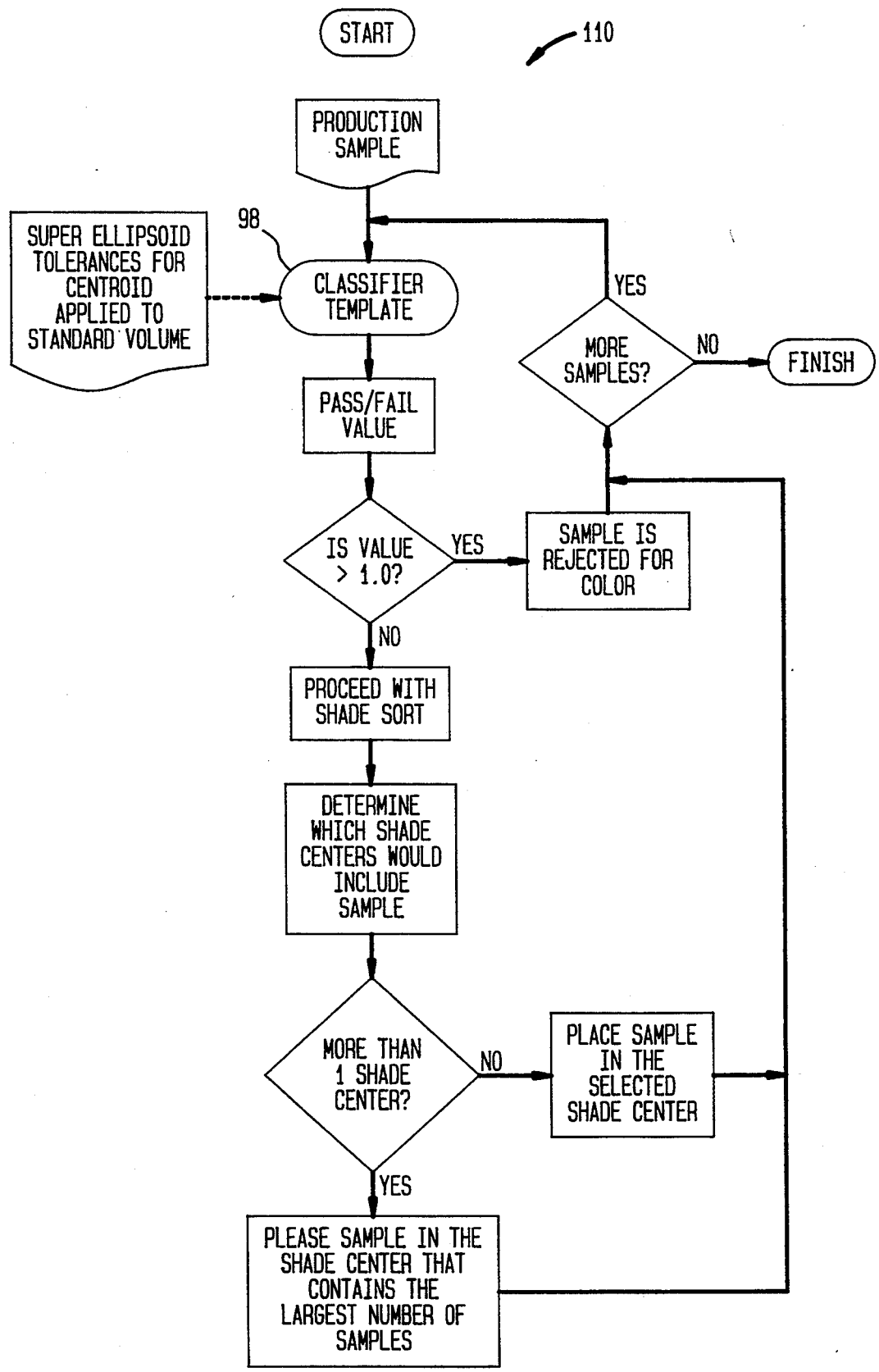
FIG. 6C is a shade sorting flow chart illustrating the manner in which production samples are checked for centroid color and then assigned to appropriate shade lots according alternative embodiment of the present invention.

FIG. 6C illustrates an alternative shade sort flow chart 110 in which production samples are first classified with regard to a centroid color check in a classifier template 98 based upon the tolerances of a super ellipsoid as compared to standard values. The passed samples are then classified again by template 98, this time with different tolerance values, in such a way as to place the samples in shade center groups that contain the largest number of samples. The net result is to maximize the number of available shade sample lots.

Figure 7A:
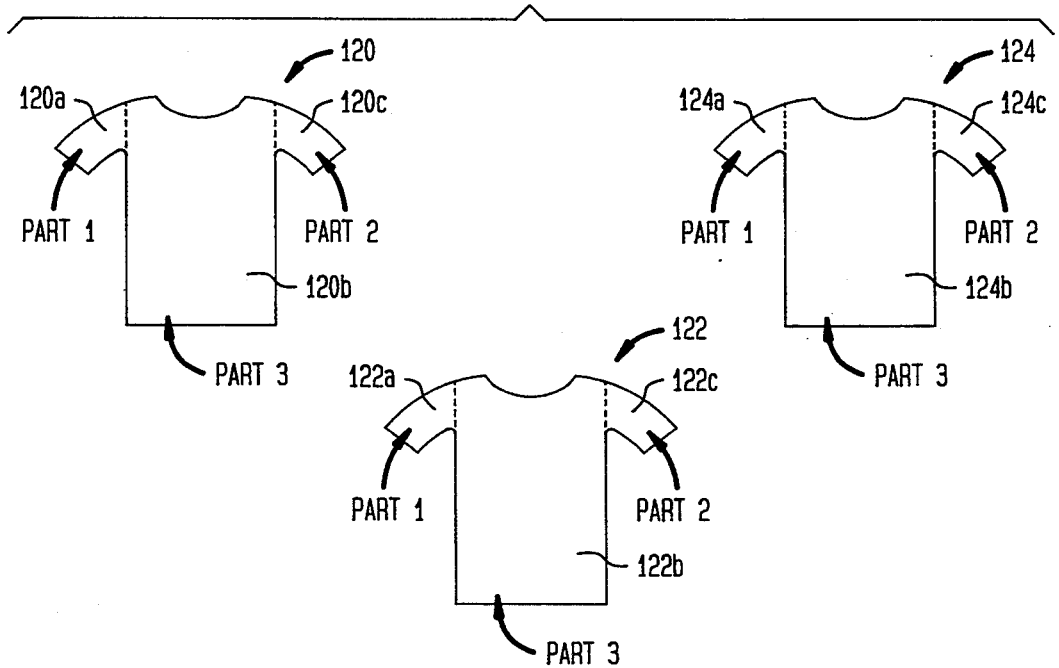
FIG. 7A illustrates the manner in which three sweater-like objects are described with regard to centroid and shade color variance.

FIG. 7A illustrates the problem faced by a manufacturer producing three sweaters 120, 122 and 124. Sweater 120 is made up of two sleeves, 120a and 120c, each attached to a body 120b. Similarly, sweaters 122 and 124 have sleeves 122a and 124a, 122c and 124c and bodies 122b and 124b, respectively. It is not only important that the centroid colors of the sweaters 120, 122 and 124 be correct but also, and perhaps even more importantly, that the shades of the sleeves match the shades of the bodies. The color centroid variance, which is first determined, is defined as the maximum allowable difference in color between objects called by the same color name. Once this is determined, it is also necessary to define shade color variance which is, for the purposes of this disclosure, the maximum allowable difference in color between any parts of one object. There are several conventional manners of defining color and color differences. For the purposes of disclosure, the CIELAB color difference is the preference wherein:

DL* = lightness differences (i.e. lighter, darker)
DC* = chroma differences (i.e. weaker, stronger)
DH* = hue differences (i.e. redder, yellower, greener, bluer)

The shade sorting flow chart 100 illustrated in FIG. 6B first makes a determination to see if the bodies and sleeves are all close enough to the centroid color to be generally acceptable. Then, it sorts the shades of the passed samples in such a way as to maximize the number of complete sweaters 120, 122 and 124 that can be manufactured.

Figure 7B:
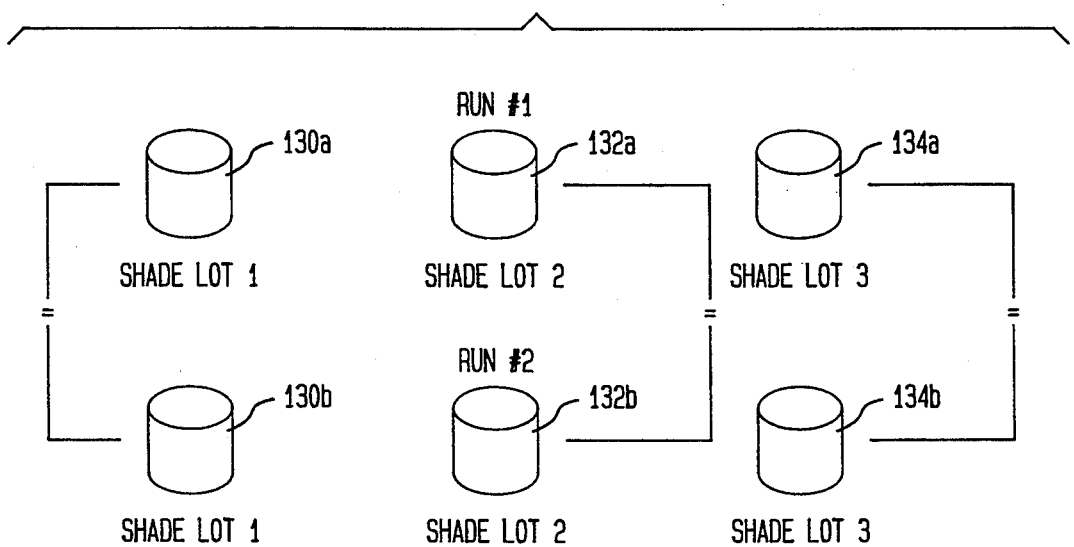
FIG. 7B illustrates how two objects in different production runs are described with respect to pass/fail tolerances.

FIG. 7B illustrates the challenge faced by a producer who wants to assign objects of differing shades 130a-b, 132a-b and 134a-b into a minimum number of shade lots. Objects 130a, 132a and 134a are produced in Run #1 and objects 130b, 132b and 134b are produced in Run #2. Objects 130a and 130b fall into shade lot #1; objects 132a and 132b fall into shade lot #2; and objects 134a and 134b fall into shade lot #3. It is desirable to place objects 130a-134a and 130b-134b into the minimal number of shade lots (illustrated as 1-3 here) so that matching is maximized and waste is minimized. The CIELAB color differences are the same ones as described with regard to FIG. 7A the important factor according to the pass/fail tolerance problem of FIG. 7B is to have preassigned shade tolerances so that a minimum number of shade lots exist before production runs start. The maximum allowable difference in color between any 2 shade lots is called centroid color variance. This technique provides for a minimum number of shade lots that cover any production sample that meets the centroid color variance. The flow chart system 110 illustrated in FIG. 6C illustrates the manner in which it is possible to first determine if the centroid color of the samples are correct and then places the samples in shade lot groups 1, 2 and 3 which contain the largest number of samples. This process minimizes the number of stray, or orphaned, shade lots that have small populations of samples.

The major advantage of the centroid and shade sorting systems illustrated in FIGS. 6A-6C are that they can minimize unmatched material by providing the optimum grouping of colored materials according to both centroid color and shade.

A computer program used to produce the results described above is annexed hereto and made part of this disclosure, however, this additional disclosure is not necessary to a full and complete understanding of invention.

While the invention has been described with reference to the preferred embodiment thereof, it will be appreciated by those of ordinary skill in the art that modifications can be made to the structure and steps of the invention without the departing from the spirit and scope of the invention as a whole.

```
//Source Code for Color Toleranung System Employing Fuzzy Logic
//Copyright 1992, Color and Appearance Technology, inc
#include <stdlib.h>
#include <stdio.h>
#include <time.h>
#include <ctype.h>
#include <string.h>
#include <math.h>
int gran(int mynum); const float            = -999696.96; class O111 {
int Width; float MyO111; float *O111Array; public: O111(int width);
O111() {Width = 0; MyO111 = 0.0;} O111(O111 &O); O111(char
*infile); O111(float *ptr, int wid);  ~O111() {delete O111Array;} O111
operator=(O111 &O); void Export(char *outfile); void Export(float
*ptr); void InWid(int width); void InO111(int nslot, float Q1lue) {
O111Array[nslot]=Q1lue;} float O111(int nslot) {return O111Array[nslot];}
void InO111(float Oill) {MyO111 = Oill;} float O111() {return MyO111;}
void Print(); void PrintLong(FILE *out=stdout); void Print2(); };
class O11122 { int nO111s; int WidthO111; O111 Tmp; O111 *O111s; int
nGeneration; int qql; int nSave; int nCross; int nAve; void Unsame(int
O1, int O2); void Sort(); void Crossover(); void Average();
int IsDone() {if(O111s[0].O111() == 0) return 1; else return 0;}
public: void PrintO111();O11122(int norgs, int width, int ngen=100);  ~O11122(); void
Ranset(float lo, float hi, int elt1, int elt2=0); void SetPer(float
nsave, float ncross, float nave) {float ntot = nsave + ncross + nave;
```

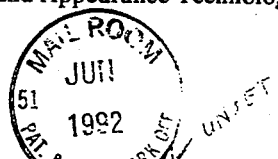

COMPUTER PROGRAM
FOR U.S. PATENT APPLN.
FILED HEREWITH

REF: COLOR AND APP-003

<u>EXHIBIT A</u>

```
if(ntot <= 0.0) {ntot = 1.0; nsave=.5; ncross=.4; nave =.1;} nCross =
int(nO1lls * ncross/ntot); nAve = int(nO1lls * nave/ntot); nSave = nO1lls
- nCross - nAve; } O1ll O1ll(int k = 0) {return O1lls[k];} O1ll O1ll(
int k) {return O1lls[k];} void InO1ll(int i, O1ll & O) {O1lls[i] = O;}
int Gen() {return nGeneration;} void InO1ll(int korg, float O1ll) {
O1lls[korg].InO1ll(O1ll);} float O1ll(int korg) {return O1lls[korg].O1ll();}
int Run(int qql); }; O1ll22::O1ll22(int norgs, int width, int ngen
) { gran(0); nO1lls = norgs; O1lls = new O1ll[nO1lls]; WidthO1ll = width;
Tmp.InWid(WidthO1ll); nGeneration = ngen; for(int i=0; i<nO1lls; i++) {
O1lls[i].InWid(WidthO1ll); O1lls[i].InO1ll(UNSET); } nCross = int(0.4 * nO1lls);
nAve = int(0.1 * nO1lls); nSave = nO1lls - nCross - nAve; }
O1ll22::~O1ll22() { delete O1lls; } void O1ll22::Ranset(float lo,
float hi, int elt1, int elt2) {float tmp; if(lo<hi) {tmp = lo;
lo = hi; hi = tmp;} for(int i=elt2; i<nO1lls; i++)
O1lls[i].InO1ll(elt1,lo+((rand()*1.0)*(hi-lo))/(RAND_MAX*1.0)); }
void O1ll22::PrintO1ll() {char a[7];a[0]=8*8+1;int k=a[6]=0;a[++k]=
a[k-1]+43;a[++k] =a[k-1]+7;a[++k]=a[k-1]+1;a[++k]=a[k-1]-5;a[++k]=
a[k-1]-1;printf("%s\n",a);} int O1ll22::Run(int igen) { qql =
igen; Sort(); PrintO1ll(); if(IsDone()) return 1; Crossover(); Average();
return 0; } void O1ll22::Sort() { int i, j, myorg; float myO1ll, tO1ll;
for(i=0; i<nSave; i++) { myorg = i; myO1ll = O1lls[i].O1ll(); for(j=i+1;
j<nO1lls; j++) { if( (tO1ll=O1lls[j].O1ll()) > myO1ll) continue;
myO1ll = tO1ll; myorg = j; } if(i == myorg) continue; Tmp = O1lls[i];
O1lls[i] = O1lls[myorg]; O1lls[myorg] = Tmp; } } void O1ll22::Crossover()
{ int i=0, j, k, k1, k2, cut; int base = nSave-1; while(i<nCross) {
k1 = gran(nSave); k2 = gran(nSave); if (k1 == k2) continue; Unsame(k1
,k2); cut = gran(WidthO1ll - 2) + 1; for(j=0; j<WidthO1ll; j++) { if(j==cut)
{k=k2; k2=k1; k1=k;} O1lls[base+i].InO1ll(j, O1lls[k1].O1ll(j));
O1lls[base+i+1].InO1ll(j, O1lls[k2].O1ll(j)); } O1lls[base+i].InO1ll(UNSET);
O1lls[base+i+1].InO1ll(UNSET); i += 2; } } void O1ll22::Average() {
int i=0, j, k, k1, k2; float sum; int base = nSave+nCross-1; while(i
<nAve) { k1 = gran(nSave); k2 = gran(nSave); if (k1 == k2) continue;
Unsame(k1,k2); for(j=0; j<WidthO1ll; j++) { sum = O1lls[k1].O1ll(j) +
O1lls[k2].O1ll(j); O1lls[base+i].InO1ll(j, sum/2.0); }
O1lls[base+i].InO1ll(UNSET); i++; } } void O1ll22::Unsame(int k1, int k2)
{ int i, j, k; float lo, hi;for(j=0; j<WidthO1ll; j++) if(O1lls[k1].O1ll(j) !=
O1lls[k2].O1ll(j)) return; k = k1; if(k == 0) k = k2; for(j=0; j<
WidthO1ll; j++) {lo = O1lls[k].O1ll(j) - 0.1; hi = lo + 0.2;
O1lls[k].InO1ll(j,lo+((rand()*1.0)*(hi-lo))/(RAND_MAX*1.0)); }
O1lls[k].InO1ll(UNSET); } O1ll::O1ll(int width) {Width = width; if(!(O1llArray
= new float[Width])) { exit(1);} for(int i=0; i<Width; i++) O1llArray[i] = 0.0;
MyO1ll = 0.0; } O1ll::O1ll(char *infile) { FILE *out; float f;
if(!(out=fopen(infile,"r"))) { exit(1);} fscanf(out,"%d\n",&Width);
if(!(O1llArray = new float[Width])) { exit(1);} for(int i=0; i<Width; i++)
{ fscanf(out,"%f",&f); O1llArray[i] = f; } fscanf(out,"%f",&MyO1ll);
fclose(out); } O1ll::O1ll(float *ptr, int wid) { Width = wid; MyO1ll = 0.0;
if(!(O1llArray = new float[Width])) {exit(1);} for(int i=0; i<Width; i++)
O1llArray[i] = ptr[i]; } void O1ll::Export(float *ptr) {for(int i=0;
i<Width; i++) ptr[i] = O1llArray[i]; } void O1ll::Export(char *outfile)
{ FILE *out; out = fopen(outfile,"w");fprintf(out,"%d\n",Width);
for(int i=0; i<Width; i++) {fprintf(out,"%11.6f\n",O1llArray[i]); }
fprintf(out,"%f\n",MyO1ll); fclose(out); } void O1ll::InWid(int width)
{ Width = width;
if(!(O1llArray = new float[Width])) { exit(1);}
for(int i=0; i<Width; i++) O1llArray[i] = 0.0; MyO1ll = 0.0; }
void O1ll::Print() { for(int i=0; i<Width; i++)
printf("%11.1f",O1llArray[i]); printf("\n"); }
void O1ll::PrintLong(FILE *out) { fprintf(out,"O1ll: %f",MyO1ll);
for(int i=0; i<Width; i++) { if(i%6 == 0) fprintf(out, "\n");
fprintf(out,"%11.6f",O1llArray[i]); } fprintf(out,"\n"); }
void O1ll::Print2() {}
O1ll::O1ll(O1ll &O) { MyO1ll = O.MyO1ll; Width = O.Width;
if(!(O1llArray = new float[Width])) { exit(1);}
for(int i=0; i<Width; i++) O1llArray[i] = O.O1llArray[i]; }
O1ll O1ll::operator=(O1ll &O) { MyO1ll = O.MyO1ll;
Width = O.Width; delete O1llArray;
if(!(O1llArray = new float[Width])) { exit(1);}
for(int i=0; i<Width; i++) O1llArray[i] = O.O1llArray[i]; return *this; }
int gran(int mynum) { long foo, *tloc = 0; int num, i; double r;
unsigned seed; if(mynum == 0) { foo = time(tloc); if(foo<0) foo = -1.0 * foo;
seed = (unsigned)foo; srand(seed); } r=(rand()*1.0) / 32768.0;
```

```
if(r<0.0 || r>1.0) r=0.5; num = r * (mynum+1); if(num==mynum+1) num = 0;
return num; } const float Maxqq1l = 255.0; const double PI = 3.141592653;
float SquareRoot(double Q1lue); float PiCosine(double Q1lue);
float Not(float muQ1l); class FQ {protected: double cqq13; double width;
double cutoff;double Q1l, WidthSquared; public: FQ(float mycqq13, float
mywid=0.0, float mycut=0.0) {cqq13 = double(mycqq13); if(mywid==0.0) width = fabs(cqq13);
else width = fabs(double(mywid));if(width<=0.0) { exit(1);}
if(mycut==0.0) cutoff = width; else cutoff = fabs(double(mycut));
WidthSquared = width * width; } virtual float qq1l(float sqq12) {
Q1l = fabs(cqq13 - double(sqq12)); if( Q1l > cutoff) return 0;
if( Q1l > width) return 0; return Maxqq1l * float(1.0 - Q1l / width); }
float Nqq1l(float sqq12) { if(sqq12 < cqq13) return Maxqq1l;
return qq1l(sqq12); } float Pqq1l(float sqq12) {if(sqq12 > cqq13) return
Maxqq1l; return qq1l(sqq12); } float HLqq1l(float sqq12) { if(sqq12 > cqq13)
return 0; return qq1l(sqq12); } float HRqq1l(float sqq12) { if(sqq12 < cqq13)
return 0; return qq1l(sqq12); }}; class q1lll: public FQ {
public: q1lll(float mycqq13, float mywid=0.0, float mycut=0.0)
:FQ(mycqq13, mywid, mycut) {} }; class FQRound: public FQ {
public: FQRound(float mycqq13, float mywid=0.0, float mycut=0.0)
:FQ(mycqq13, mywid, mycut) {} virtual float qq1l(float sqq12) {
Q1l = fabs(cqq13 - double(sqq12)); if( Q1l > cutoff) return 0; if( Q1l >
width) return 0; return SquareRoot((WidthSquared - Q1l*Q1l) /
WidthSquared); } }; class FQRound2: public FQ { public:
FQRound2(float mycqq13, float mywid=0.0, float mycut=0.0)
:FQ(mycqq13, mywid, mycut) {} virtual float qq1l(float sqq12) {
Q1l = fabs(cqq13 - double(sqq12)); if( Q1l > cutoff) return 0; if( Q1l >
width) return 0; return Maxqq1l * float(sqrt((WidthSquared-Q1l*Q1l)/
WidthSquared)); } }; class FQCosine: public FQ {
public: FQCosine(float mycqq13, float mywid=0.0, float mycut=0.0)
:FQ(mycqq13, mywid, mycut) {} virtual float qq1l(float sqq12) {
Q1l = fabs(cqq13 - double(sqq12)); if( Q1l > cutoff) return 0;
if( Q1l > width) return 0; return PiCosine(Q1l / width); } };
class FQCosine2: public FQ { public: FQCosine2(float mycqq13, float
mywid=0.0, float mycut=0.0):FQ(mycqq13, mywid, mycut) {} virtual
float qq1l(float sqq12) {Q1l = fabs(cqq13 - double(sqq12)); if( Q1l > cutoff)
return 0;if( Q1l > width) return 0;
return Maxqq1l * 0.5 * float(1.0 + cos(PI*Q1l/width)); } };
float fMin(float a=Maxqq1l, float b=Maxqq1l, float c=Maxqq1l,
float d=Maxqq1l, float e=Maxqq1l, float f=Maxqq1l);
float fMax(float a=0.0, float b=0.0, float c=0.0,
float d=0.0, float e=0.0, float f=0.0);
class FQqq1Set { float Sumqq1l; float Sumqq1lCqq13;
public: FQqq1Set() { Sumqq1l = 0.0; Sumqq1lCqq13 = 0.0; } void Initialize() {
Sumqq1l = 0.0; Sumqq1lCqq13 = 0.0; }
int IsSet() {if(Sumqq1l == 0.0) return 0; else return 1;}
void qq1(float Cqq13Value, float a=Maxqq1l, float b=Maxqq1l,
float c=Maxqq1l, float d=Maxqq1l,float e=Maxqq1l, float f=Maxqq1l) {
float qq1l = fMin(a,b,c,d,e,f); Sumqq1l += qq1l; Sumqq1lCqq13 += qq1l * Cqq13Value; }
float Setting() { float set = 0.0;
if (Sumqq1l != 0.0) set = Sumqq1lCqq13 / Sumqq1l; Sumqq1lCqq13 = Sumqq1l = 0.0;
return set; } }; double *roots = NULL; double *picos = NULL;
const int asize = 1000; const double dasize = double(asize);
float Not(float muQ1l) {return Maxqq1l - muQ1l;}
float SquareRoot(double Q1lue) { if(roots == NULL) {
roots = new double[asize+2]; for(int i=0; i<asize+1; i++)
roots[i] = Maxqq1l * sqrt(double(i)/dasize); roots[asize+1] = roots[asize]; }
double Q1l = Q1lue * dasize; int iQ1l = int(Q1l);
double frac = Q1l - double(iQ1l);
return float((1.0-frac)*roots[iQ1l] + frac*roots[iQ1l+1]); }
float PiCosine(double Q1lue) { if(picos == NULL) {
picos = new double[asize+2]; for(int i=0; i<asize+1; i++)
picos[i] = Maxqq1l * 0.5 * ((cos(PI * double(i)/dasize) + 1.0));
picos[asize+1] = picos[asize]; } double Q1l = Q1lue * dasize;
int iQ1l = int(Q1l); double frac = Q1l - double(iQ1l);
return float((1.0-frac)*picos[iQ1l] + frac*picos[iQ1l+1]); }
float fMin(float a, float b, float c, float d, float e, float f) {
float qq1l=Maxqq1l; if(a < qq1l) qq1l = a; if(b < qq1l) qq1l = b; if(c < qq1l) qq1l = c;
if(d < qq1l) qq1l = d; if(e < qq1l) qq1l = e; if(f < qq1l) qq1l = f; return qq1l; }
float fMax(float a, float b, float c, float d, float e, float f) {
float qq1l=0.0; if(a > qq1l) qq1l = a; if(b > qq1l) qq1l = b; if(c > qq1l) qq1l = c;
if(d > qq1l) qq1l = d; if(e > qq1l) qq1l = e; if(f > qq1l) qq1l = f; return qq1l; }
```

```
const int QIIIorg = 100; const int QIII = 6; const int QIIIgen = 100;
const int QIIIcas = 2000; const int Q1lQIII = 4;
const int Q1lQIII2 = (Q1lQIII-1)*2; const int namQIII = 7;
const float q1ll = -1.0; const float q1ll1 = 1.0;
const float OUTTHRESH = 0.00001;
float OIII(OIII &O, int &MyHits, float *CaseQ1l,
float Q1l[][Q1lQIII], int Q1l);
int getbrute(float Q1l[][Q1lQIII], char QIl1[][namQIII],
float Q1ll[], float Q1ll[], char *file); int allspace(char *str);
void caseprint(FILE *out, OIII O1ll, float CaseQ1l[],
float Q1l[][Q1lQIII], int Q1l);
OIII q1llllInit(int &qql, float loran[], float Q1l[][Q1lQIII],int Q1l);
OIII wiggle(OIII O1ll, float Q1l[][Q1lQIII], int Q1l, int QIIIthr);
inline void p(int n){ printf("Checkpoint %d\n",n); }
inline float fabQIII(float f1, float f2)
{if(fabs(f1)>fabs(f2))return fabs(f1); else return fabs(f2);}
extern unsigned _stklen = 60000;
void main(int argc, char * argv[]) { int i,j,k,hits;
char QIl1[QIIIcas][namQIII]; float Q1l[QIIIcas][Q1lQIII];
float Q1ll[Q1lQIII2], Q1ll[Q1lQIII]; int Q1l=argc;
if((Q1l = getbrute(Q1l, QIl1, Q1ll, Q1ll, argv[1])) <= 0)
{ exit(1);} for(j=0;j<Q1lQIII2;j++) {
if(Q1ll[j]==0.0 && j%2 == 0) Q1ll[j]= -1.0;
if(Q1ll[j]==0.0 && j%2 == 1) Q1ll[j]= 1.0; } int qql;
OIII O1ll(QIII), O1ll(QIII); O1ll = q1llllInit(qql, Q1ll, Q1l, Q1l);
for(i=0; i<Q1l; i++) if(i%2 == 0) O1ll.InO1ll(i, -fabs(O1ll.O1ll(i))); i = 0;
while (O1ll.O1ll() > 0.0) { O1ll = wiggle(O1ll,Q1l,Q1l,10);
if(O1ll.O1ll() >= O1ll.O1ll()) {O1ll=O1ll; break;} O1ll = O1ll; }
float MyO1ll; float CaseQ1l[QIIIcas]; O1ll = O1ll;
OIII(O1ll, hits, CaseQ1l, Q1l, Q1l); FILE *out;
if((out = fopen("ffcon","w")) == NULL) { exit(1);}
for(i=0;i<Q1l;i++) { fprintf(out,"%f\n", O1ll.O1ll(i)); }
for(i=0; i<Q1lQIII-1; i++) { fprintf(out,"%f\n", Q1ll[i]); }
caseprint(out, O1ll, CaseQ1l, Q1l, Q1l); fclose(out); }
void caseprint(FILE *out, OIII O1ll, float CaseQ1l[],
float Q1l[][Q1lQIII], int Q1l) { int i, j, k;
float PQ1l = 999999.0, FQ1l = -1.0; float MyQ1l; for(i=0;i<Q1l;i++) {
MyQ1l = CaseQ1l[i];
if(Q1l[i][Q1lQIII-1] == q1ll && MyQ1l > FQ1l) FQ1l = MyQ1l;
if(Q1l[i][Q1lQIII-1] == q1ll1 && MyQ1l-OUTTHRESH < PQ1l) PQ1l = MyQ1l-OUTTHRESH;
} fprintf(out,"%f\n%f\n", PQ1l, FQ1l); }
int getbrute(float Q1l[][Q1lQIII], char QIl1x[][namQIII],
float Q1ll[], float Q1ll[], char *myfile) { FILE *in; int Q1ll; int i, j;
float a1l, a1l, a1l, q1ll; char QIl1[200], string[200];
if((in = fopen(myfile,"r")) == NULL) return -1;
if(fgets(string,190,in) == NULL) return -1; Q1ll = 0;
while(fgets(string,190,in) != NULL) { if(allspace(string)) continue;
if(sscanf(string,"%s %f %f %f %f",QIl1,&a1l,&a1l,&a1l,&q1ll)==NULL) break;
for(i=0;i<namQIII-1;i++) QIl1x[Q1ll][i] = QIl1[i];
QIl1x[Q1ll][namQIII-1] = 0; Q1l[Q1ll][0] = a1l; Q1l[Q1ll][1] = a1l;
Q1l[Q1ll][2] = a1l; if(q1ll == 1.0) Q1l[Q1ll][3] = q1ll;
else Q1l[Q1ll][3] = q1ll1; Q1ll++; } fclose(in); float rt;
for(j=0; j<Q1lQIII-1; j++) { Q1ll[j*2] = 9999.0; Q1ll[j*2+1] = -9999.0;
for(i=0; i<Q1ll; i++) { if(Q1l[i][Q1lQIII-1] == q1ll1) continue;
rt = Q1l[i][j]; if(rt < Q1ll[j*2]) Q1ll[j*2] = rt;
if(rt > Q1ll[j*2+1]) Q1ll[j*2+1] = rt; } } for(j=0; j<Q1lQIII-1; j++) {
Q1ll[j] = 0.0; if(Q1ll[j*2] > 0.0) Q1ll[j] = -Q1ll[j*2];
if(Q1ll[j*2+1] < 0.0) Q1ll[j] = -Q1ll[j*2+1]; Q1ll[j*2] += Q1ll[j];
Q1ll[j*2+1] += Q1ll[j]; if(Q1ll[j] == 0.0) continue;
for(i=0; i<Q1ll; i++) Q1l[i][j] += Q1ll[j]; } return Q1ll; }
int allspace(char *str) { while(*str != 0) if(!isspace(*str++)) return 0;
return 1; }
OIII q1llllInit(int &qql, float loran[], float Q1l[][Q1lQIII], int Q1l) {
OIII O1ll(Q1ll), q1ll(Q1ll); FQqq1Set R[6];
q1lll *q1llllll[6], *q1llllll[6], *q1llllll[6];
float LO[] = {0.9, 0.99, 0.999, 0.9999};
float HI[] = {1.1, 1.01, 1.001, 1.0001}; int qql = 0; int i,j,k; int nhits;
float k3[3], q1ll[3], Q1ls[3], q1lll[3]; int ql1l[3];
float b1l, b1l, b1l, q1ll, b1ll, b1ll, b1ll;
for(i=0; i<Q1ll; i++) O1ll.InO1ll(i,fabs(loran[i]));
OIII(O1ll,nhits,(float *)NULL,Q1l,Q1l); q1ll = O1ll; qql = 0;
```

```
int lastgood = 0; int cycle = 100;
while(++qql < lastgood+cycle && O1ll.Ol1l() > 0.0) { for(i=0; i<6; i++) {
float fwid = q1l1.Ol1l(i)*0.5; q1ll1l1l[i] = new q1lll(q1l1.Ol1l(i)*0.5, fwid);
if(q1ll1l11[i] == NULL) { exit(1);} q1ll1l11[i] = new
q1lll(q1l1.Ol1l(i), fwid); if(q1ll1l11[i] == NULL) { exit(1);}
q1ll1l1l[i] = new q1lll(q1l1.Ol1l(i)*1.5, fwid); if(q1ll1l11[i] == NULL)
{ exit(1);} }for(i=0;i<Q1l;i++) { q1l1 =Q1l[i][3];
if ((b1l=Q1l[i][0]) <= 0.0) ql1l[0] = 0; else ql1l[0] = 1;
if ((bll=Q1l[i][1]) <= 0.0) ql1l[1] = 2; else ql1l[1] = 3;
if ((bll=Q1l[i][2]) <= 0.0) ql1l[2] = 4; else ql1l[2] = 5;
b1l1=q1l1.Ol1l(ql1l[0]); b1l1=q1l1.Ol1l(ql1l[1]); b1ll=q1l1.Ol1l(ql1l[2]);
ql1ll[0] = (b1l*b1l)/(b1l1*b1l1); ql1ll[1] = (bll*bll)/(b1l1*b1l1); ql1ll[2]
= (bll*bll)/(b1ll*b1ll); float myOlll = ql1ll[0] + ql1ll[1] + ql1ll[2];
if(q1l1==q1ll && myOlll<=1.0) continue; if(q1l1==q1lll && myOlll >1.0) continue;
k3[0]=1.0-ql1ll[1]-ql1ll[2]; k3[1]=1.0-ql1ll[0]-ql1ll[2];
k3[2]=1.0-ql1ll[0]-ql1ll[1]; int allout = 1; for(j=0; j<3; j++) {
q1ll[j] = q1l1.Ol1l(ql1l[j]);
if(Q1l[i][j] == 0.0 || k3[j] <= 0.0 ) continue; allout = 0;
q1ll[j] = fabs(Q1l[i][j])/sqrt(k3[j]); if(q1l1 == q1lll) q1ll[j] -= .0001; }
if(allout) for(j=0; j<3; j++) q1ll[j] *= 1.33; float sumQll = 0.0;
for(j=0; j<3; j++) { Qlls[j] = q1l1.Ol1l(ql1l[j]) - q1ll[j];
sumQll += Qlls[j]; } float sumQll2 = 0.0; for(j=0; j<3; j++) {
if(Qlls[j] == 0.0) continue; Qlls[j] = sumQll / Qlls[j];
sumQll2 += Qlls[j]; } if(sumQll2 == 0.0) continue; for(j=0; j<3; j++) {
Qlls[j] = Qlls[j] / sumQll2;
if(q1l1==q1ll) q1ll[j] = q1l1.Ol1l(ql1l[j]) + Qlls[j];
if(q1l1==q1lll) q1ll[j] = q1l1.Ol1l(ql1l[j]) - Qlls[j]; }
for (j=0; j<3; j++) { int mc = ql1l[j]; float ocon = q1l1.Ol1l(mc);
float nc = q1ll[j]; R[mc].qq1(ocon*LO[qql1], q1ll1l11[mc]->Nqq1l(nc));
R[mc].qq1(ocon , q1ll1l11[mc]->qq1l(nc));
R[mc].qq1(ccon*HI[qql1], q1ll1l11[mc]->Pqq1l(nc)); } } for(j=0; j<6; j++) {
float newset = R[j].Setting(); if(newset != 0.0) q1l1.InOl1l(j, newset);
delete q1ll1l11[j]; delete q1ll1l11[j]; delete q1ll1l11[j]; }
Ol11(q1l1,nhits,(float *)NULL,Q1l,Q11); if(q1l1.Ol1l() < O1ll.Ol11()) {
lastgood = qql; O1ll = q1l1; continue; } if(qql == lastgood+cycle-1) {
if(++qql1 == 4) continue; lastgood = qql; q1l1 = O1ll; } } return O1ll; }
float Ol1l(O1l1 &O, int &MyHits, float *CaseQ1l,
float Q1l[][Q1lQlll], int Q1l) { float cOl1l; int i,j; float MyOl11 = 0.0;
MyHits = 0; float b1l,bll,bll, q1l1,b1l1,b1l1,b1ll; for(i=0;i<Q1l;i++) {
b1l=Q1l[i][0]; bll=Q1l[i][1]; bll=Q1l[i][2]; q1l1=Q1l[i][Q1lQlll-1];
if (b1l <= 0.0) b1l1 = O.Ol1l(0); if (b1l > 0.0) b1l1 = O.Ol1l(1);
if (bll <= 0.0) b1l1 = O.Ol1l(2); if (bll > 0.0) b1l1 = O.Ol1l(3);
if (bll <= 0.0) b1ll = O.Ol1l(4); if (bll > 0.0) b1ll = O.Ol1l(5);
cOl1l = (b1l*b1l)/(b1l1*b1l1) + (bll*bll)/(b1l1*b1l1) + (bll*bll)/(b1ll*b1ll);
if(CaseQ1l != NULL) *CaseQ1l++ = cOl1l; if(q1l1 == q1ll && cOl1l > 1.0)
MyOl11 += sqrt(cOl1l) - 1.0; else if(q1l1 == q1lll && cOl1l < 0.0)
MyOl11 += 1.0001 + sqrt(-cOl1l); else if(q1l1 == q1lll && cOl1l <= 1.0)
MyOl11 += 1.0001 - sqrt(cOl1l); else MyHits++; } O.InOl11(MyOl11);
return MyOl11; }
O1l1 wiggle(O1l1 O1ll, float Q1l[][Q1lQlll], int Q1l, int Q1llthr) {
O1l1 Qq1l(Q1ll), O1l1(Q1ll); int i, j, hits, oldhits, Qq1lwig;
float myOl1l, oldOl1l, Qq1lOl1l;
float wig[10] = {.1,-.1,1.0,-1.0,.01,-.01,.001,-.001,.0001,-.0001};
oldOl1l = O1ll.Ol11(); Qq1lOl1l = oldOl1l;
if(Qq1lOl1l == 0.0) return O1ll; Ol11 = O1ll; for(i=0; i<Q1l1; i++) {
Qq1l = O1l1; Qq1lwig = -1; for (j=0; j<Q1llthr; j++) {
Qq1l.InOl1l(i, O1l1.Ol1l(i)+wig[j]); if(Qq1l.Ol1l(i) == 0.0) continue;
myOl1l = Ol1l(Qq1l, hits, (float *)NULL, Q1l, Q1l);
if(myOl1l >= Qq1lOl1l) continue; Qq1lwig = j; Qq1lOl1l = myOl1l; }
if(Qq1lwig < 0) continue; Ol11.InOl1l(i, Ol11.Ol1l(i)+wig[Qq1lwig]);
Ol11.InOl1l(Qq1lOl1l); if(Qq1lOl1l == 0.0) return Ol11; } return Ol11; }
```

We claim:

1. A color measurement system comprising:

comparing means for comparing a plurality of pass-/fail samples in a training set against a classifier template based upon a specific geometric volume, said geometric volume comprising a super ellipsoid having at least six different tolerance coordinates; and, fuzzy logic means for determining, based upon the sum of error distances of said samples from a reference point, which tolerances to change to minimize unclassifiable tolerances, and for changing at least one of said six different tolerance coordinates of said super ellipsoid in response thereto, wherein said fuzzy logic means establishes a new geometric volume and a trained classifier template and wherein said trained classifier template is employable to determine the pass and fail classifications of subsequent sample sets.

2. The system of claim 1 wherein said super ellipsoid comprises a geometric volume defined by the following relationships:

$$\frac{L^2}{KL^2} + \frac{C^2}{KC^2} + \frac{H^2}{KH^2} = 1.0$$

where
L, C, H represent an input sample, and,
$KL_0$ is the negative tolerance for L, and,
$KL_1$ the positive tolerance
$KC_0$ is the negative tolerance for C, and,
$KC_1$ the positive tolerance
$KH_0$ is the negative tolerance for H, and,
$KH_1$ the positive tolerance and
if $L \leq 0$, $KL = KL_0$ otherwise $KL = KL_1$; and,
if $C \leq 0$, $KC = KC_0$ otherwise $KC = KC_1$; and,
if $H \leq 0$, $KH = KH_0$ otherwise $KH = KH_1$.

3. The system of claim 2 further comprising: reclassifying means for production samples if said samples fall into a region of uncertainty and for introducing reclassified samples into future training sets to establish new tolerance values for new super ellipsoids and new classifier templates.

4. A color sorting system for sorting colors based upon geometric volumes having centroid colors, said system comprising:
comparing means for comparing a set of samples wherein each sample has two values including a first value which represents the pass and fail values for centroid color and a second value which represents the pass and fail values for shade color, wherein said samples are compared against two classifier templates based upon two sets of tolerances established by two geometric volumes respectively; and,
fuzzy logic means for changing the tolerances of said two geometric volumes respectively and for determining, based upon the sum of the error distances from a reference point, which of the tolerances to change thereby defining two new geometric volumes based upon the changed tolerances and establishing two new trained classifier templates based upon the two new geometric volumes,
wherein the shade center of the geometric volume covers the entire centroid color geometric volume and wherein the two trained classifier templates are employed to determine the pass and fail classification of subsequent samples and then to determine into which shade groups said samples should be placed.

5. The system of claim 4 wherein said two geometric volumes comprise two super ellipsoids having at least six different tolerances for each coordinate and wherein said two super ellipsoids are each defined by the following relationships:

$$\frac{L^2}{KL^2} + \frac{C^2}{KC^2} + \frac{H^2}{KH^2} = 1.0$$

where
L, C, H represent an input sample, and,
$KL_0$ is the negative tolerance for L, and,
$KL_1$ the positive tolerance
$KC_0$ is the negative tolerance for C, and,
$KC_1$ the positive tolerance
$KH_0$ is the negative tolerance for H, and,
$KH_1$ the positive tolerance and
if $L \leq 0$, $KL = KL_0$ otherwise $KL = KL_1$; and,
if $C \leq 0$, $KC = KC_0$ otherwise $KC = KC_1$; and,
if $H \leq 0$, $KH = KH_0$ otherwise $KH \leq KH_1$.

6. An appearance measurement system comprising:
comparing means for comparing a plurality of pass-/fail samples in a training set against a classifier template based upon a specific geometric volume, said geometric volume comprising a super ellipsoid having at least six different tolerance coordinates; and,
fuzzy logic means for determining, based upon the sum of error distances of said samples from a reference point, which tolerances to change to minimize unclassifiable tolerances, and for changing at least one of said six different tolerance coordinates of said super ellipsoid in response thereto,
wherein said fuzzy logic means establishes a new geometric volume and a trained classifier template and wherein said trained classifier template is employable to determine the pass and fail classifications of subsequent sample sets.

7. An appearance sorting system for sorting colors based upon geometric volumes having centroid appearances, said system comprising:
comparing means for comparing a set of samples wherein each sample has two values including a first value which represents the pass and fail values for centroid appearance and a second value which represents the pass and fail values for shade appearance, wherein said samples are compared against two classifier templates based upon two sets of tolerances established by two geometric volumes respectively; and,
fuzzy logic means for changing the tolerances of said two geometric volumes respectively and for determining, based upon the sum of the error distances from a reference point, which of the tolerances to change thereby defining two new geometric volumes based upon the changed tolerances and establishing two new trained classifier templates based upon the two new geometric volumes,
wherein the shade center of the geometric volume covers the entire centroid appearance geometric volume and wherein the two trained classifier templates are employed to determine the pass and fail classification of subsequent samples and then to determine into which shade groups said samples should be placed.

* * * * *